United States Patent
Cao et al.

(10) Patent No.: US 11,769,259 B2
(45) Date of Patent: *Sep. 26, 2023

(54) REGION-BASED STABILIZED FACE TRACKING

(71) Applicant: Snap Inc., Santa Monica, CA (US)

(72) Inventors: Chen Cao, Los Angeles, CA (US);
Menglei Chai, Los Angeles, CA (US);
Linjie Luo, Los Angeles, CA (US);
Oliver Woodford, Santa Monica, CA (US)

(73) Assignee: Snap Inc., Santa Monica, CA (US)

(*) Notice: Subject to any disclaimer, the term of this patent is extended or adjusted under 35 U.S.C. 154(b) by 237 days.

This patent is subject to a terminal disclaimer.

(21) Appl. No.: 17/248,908

(22) Filed: Feb. 12, 2021

(65) Prior Publication Data
US 2021/0165998 A1 Jun. 3, 2021

Related U.S. Application Data

(63) Continuation of application No. 16/170,997, filed on Oct. 25, 2018, now Pat. No. 10,949,648.
(Continued)

(51) Int. Cl.
*G06T 7/246* (2017.01)
*G06T 13/40* (2011.01)
(Continued)

(52) U.S. Cl.
CPC ............ *G06T 7/251* (2017.01); *G06T 7/73* (2017.01); *G06T 13/40* (2013.01); *G06V 10/774* (2022.01);
(Continued)

(58) Field of Classification Search
CPC ...... G06V 40/161; G06V 10/774; G06T 7/73; G06T 13/40
See application file for complete search history.

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 109863532 A | 6/2019 |
| CN | 110168478 A | 8/2019 |

(Continued)

OTHER PUBLICATIONS

U.S. Appl. No. 16/170,997, filed Oct. 25, 2018, Region-Based Stabilized Face Tracking.
(Continued)

*Primary Examiner* — Qun Shen
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for accessing a set of images depicting at least a portion of a face. A set of facial regions of the face is identified, each facial region of the set of facial regions intersecting another facial region with at least one common vertex that is a member of a set of facial vertices. For each facial region of the set of facial regions, a weight formed from a set of region coefficients is generated. Based on the set of facial regions and the weight of each facial region of the set of facial regions, the face is tracked across the set of images.

20 Claims, 14 Drawing Sheets

Related U.S. Application Data

(60) Provisional application No. 62/620,823, filed on Jan. 23, 2018.

(51) Int. Cl.
*G06T 7/73* (2017.01)
*G06V 40/16* (2022.01)
*G06V 10/774* (2022.01)
*G06V 10/62* (2022.01)

(52) U.S. Cl.
CPC .......... *G06V 40/161* (2022.01); *G06V 40/165* (2022.01); *G06V 40/176* (2022.01); *G06V 10/62* (2022.01)

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,254,647 B1 | 8/2012 | Nechyba et al. | |
| 8,384,719 B2 | 2/2013 | Reviile et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,241,184 B2 | 1/2016 | Weerasinghe | |
| 9,256,860 B2 | 2/2016 | Herger et al. | |
| 9,314,692 B2 | 4/2016 | Konopiev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouazlz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegei et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,636,193 B1 * | 4/2020 | Sheikh | G06V 20/20 |
| 10,657,701 B2 | 5/2020 | Osman | |
| 2002/0067362 A1 | 6/2002 | Agostino Nocera et al. | |
| 2002/0169644 A1 | 11/2002 | Greene | |
| 2005/0084140 A1 * | 4/2005 | Kakadiaris | G06V 40/172 |
| | | | 382/118 |
| 2005/0162419 A1 | 7/2005 | Kim | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2008/0187187 A1 * | 8/2008 | Tezuka | G06V 40/161 |
| | | | 382/118 |
| 2009/0014015 A1 * | 1/2009 | Tutar | A61N 5/1027 |
| | | | 600/7 |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reviile et al. | |
| 2010/0115426 A1 | 5/2010 | Liu et al. | |
| 2010/0162149 A1 | 6/2010 | Sheieheda et al. | |
| 2010/0203968 A1 | 8/2010 | Gill et al. | |
| 2010/0227682 A1 | 9/2010 | Reviile et al. | |
| 2011/0093780 A1 | 4/2011 | Dunn et al. | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |

(56) References Cited

U.S. PATENT DOCUMENTS

| | | |
|---|---|---|
| 2013/0103760 A1 | 4/2013 | Golding et al. |
| 2013/0201187 A1 | 8/2013 | Tong et al. |
| 2013/0235045 A1* | 9/2013 | Corazza .............. G06V 40/172 |
| | | 345/473 |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0362091 A1* | 12/2014 | Bouaziz ................ G06T 15/503 |
| | | 345/473 |
| 2015/0035825 A1 | 2/2015 | Zhou et al. |
| 2015/0206349 A1 | 7/2015 | Rosenthal et al. |
| 2016/0134840 A1 | 5/2016 | Mcculloch |
| 2016/0210500 A1* | 7/2016 | Feng ................... G06V 10/7553 |
| 2016/0234149 A1 | 8/2016 | Tsuda et al. |
| 2016/0335486 A1 | 11/2016 | Fleishman et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0068178 A1 | 3/2018 | Theobalt et al. |
| 2018/0113587 A1 | 4/2018 | Allen et al. |
| 2018/0115503 A1 | 4/2018 | Baldwin et al. |
| 2018/0315076 A1 | 11/2018 | Andreou et al. |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0147224 A1 | 5/2019 | Li et al. |
| 2019/0188920 A1 | 6/2019 | Mcphee et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 16/170,997, Examiner Interview Summary dated Jul. 21, 2020", 3 pgs.

"U.S. Appl. No. 16/170,997, Non Final Office Action dated May 13, 2020", 11 pgs.

"U.S. Appl. No. 16/170,997, Notice of Allowance dated Jul. 30, 2020", 5 pgs.

"U.S. Appl. No. 16/170,997, Notice of Allowance dated Nov. 17, 2020", 5 pgs.

"U.S. Appl. No. 16/170,997, Response filed Jul. 20, 2020 to Non Final Office Action dated May 13, 2020", 10 pgs.

"Google Scholar Search Results", Retrieved by the Examiner on Jul. 24, 2020, (Jul. 24, 2020), 6 pgs.

* cited by examiner

REGION-BASED STABILIZED FACE TRACKING

CROSS-REFERENCE TO RELATED APPLICATIONS

This application is a continuation of U.S. patent application Ser. No. 16/170,997, filed on Oct. 25, 2018, which claims the benefit of priority to U.S. Provisional Application Ser. No. 62/620,823, filed on Jan. 23, 2018, each of which are incorporated herein by reference in their entireties.

TECHNICAL FIELD

Embodiments of the present disclosure relate generally to facial tracking within video streams. More particularly, but not by way of limitation, the present disclosure addresses systems and methods for region-based stabilized face tracking within video streams.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

In detecting and tracking objects, such as faces, within a video stream received by a telecommunications application or device, linear facial shape models are predominantly used. Linear facial shape models may impose limitations related to rich or dynamic facial expressions or movements. Often, real-time face tracking systems estimate model parameters together with rigid head poses. Such estimations incur residual regression errors for expressions resulting from limitations in expressiveness capabilities of these linear models and affect the accuracy of rigid head pose estimates. As a result, tracked head motion may appear unstable and prone to jitter and other tracking or visual display errors.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
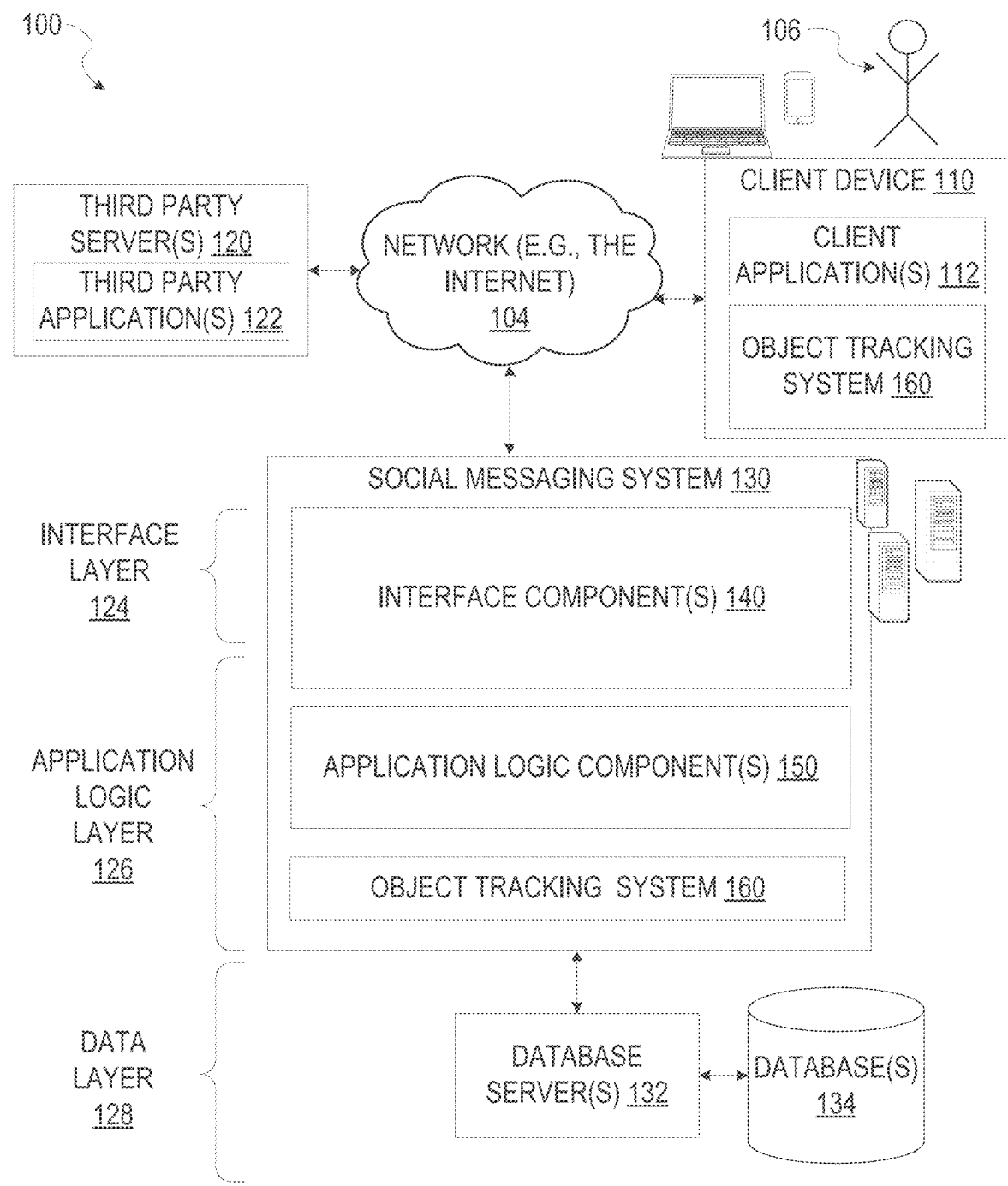
FIG. 1 is a block diagram illustrating a networked system, according to some example embodiments.

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The concepts and embodiments of the present disclosure may enable stable, real-time object tracking within a video stream. For example, a user may open a video chat or social messaging application on a smartphone. The user may point a camera of the smartphone at their face and be depicted on a screen of the smartphone within the application. The user makes selections to superimpose or overlay graphics, effects, or augmented reality elements over their face or control an avatar based on the user's face. During operation of the application, an object tracking system cooperating with the application may track the user's face and position the graphics, effects, or augmented reality elements (e.g., avatars) relative to the face in a stable manner, in real-time.

Embodiments of the present disclosure describe systems and methods of object tracking within a video stream or across a set of images. For example, in face tracking, some previous systems used linear face shape models to perform real-time or near real-time 3D face tracking based on simplicity and gains in efficiency over previous systems. However, such linear face shape models may impose limitations in representing rich facial expressions. Some real-time or near real-time face tracking estimates model parameters together with rigid head poses. As a result, residual errors for expressions resulting from limited expressiveness of linear face shape models affect the accuracy of rigid head pose estimates. The resulting inaccuracies can cause tracked head motion to be jittery and appear unstable.

Some previous systems, such as holistic linear expression models using blend shapes, may restrict model expressiveness. Such models may be used as regularizers against non-face shapes. However, the models may also impose strong global geometric correlation on the objects or shapes being tracked. Such geometric correlations may prevent the models from faithfully modeling local expressions or point deformations within objects, where the local expressions or point deformations involve only a portion of the object being tracked. For example, raising an eyebrow or opening a mouth of a face may present the blend shape models with difficulty when attempting to perform tracking operations. By way of further example, connections between vertices of a holistic model may enforce global correlation, where a movement or deformation of one portion of an object or face may affect other vertices due to geometric correlations connecting all of the vertices.

Similarly, common optimization schemes which couple parameter estimates for rigid head poses and facial expressions may present errors propagated across the tracked object in certain situations. Residual expression fitting errors may result from the coupling of parameter estimates in previous systems, which may result in limited expressiveness or localized deformation of a tracked object. Further, the residual expression fitting errors may cause problems in tracking operations by propagating errors in estimation of rigid poses (e.g., rigid head poses) and cause problems of rigid stability. In such instances, a tracked object, such as a head, will appear jittery or unstable.

The above-referenced limitations of linear face shape models, and more, are addressed by embodiments of the present disclosure. Embodiments of the present disclosure describe systems and methods for improving model expressiveness and rigid stability for real-time monocular object tracking using region-based models. This approach may incorporate dense motion-guided correctives from fast optical flow to improve tracking fidelity and reduce residual expression-fitting errors while improving rigid stability in a joint optimization framework for rigid object pose and expression parameters. Adaptive rigidity weighting may also be used to prioritize different regions in the region-based model for object pose and expression optimizations based on their rigidity during tracking.

In some instances, a region-based model and region-based object tracking are described. The region-based model improves expressiveness and stability of object or facial tracking within a video stream in real-time or near real-time. The region-based models described herein divide or segment different regions of an object (e.g., a face) and model shape variations separately for improved model expressiveness and movement. In some embodiments, adaptive rigid regularization is incorporated to further stabilize rigid pose estimation based on expression or deformation variability of each region. Further, rigid and non-rigid optimizations are used in some embodiments to jointly estimate model and rigid pose parameters based on landmark and photometric constraints. The photometric constraints may be taken from an efficient optical flow. Resulting embodiments of the present disclosure enable tracking of objects in real-time with improved accuracy and stability compared to previous systems.

Further, real-time monocular face tracking is performed by some embodiments of the present disclosure. In some embodiments, the real-time monocular face tracking, performed using the region-based modeling described herein, segments a face into different regions based on motion-correlated local clusters. The clusters are inferred from real facial performance data sets. The region-based models handle local expression or deformation for interactive face manipulations and tracking. Since faces have varying piecewise rigidity, where portions of human faces are more flexible than others, region-based modeling may enable tracking of expressions or deformations, which are not well represented using global or holistic linear expression models. Such deformation freedom of each sub-region, within a multi-region model, enables both rigid motion and non-rigid deformation to be tracked and represented. Thus, embodiments of the present disclosure enable regional deformations or expressions within the region-based model. The regional deformations or expressions isolate or partially isolate expressions in a manner mimicking natural results of a face or other object deformation. This enables additional expressiveness to faithfully model localized expressions (e.g., raising an eyebrow, opening mouth) as compared to conventional techniques.

The region-based models may be applied in a joint optimization of both rigid head pose parameters and expression parameters. Further, a dense motion-guided corrective operation is performed, in some embodiments, to increase expressiveness of the region-based model and improve overall tracking fidelity. The dense motion-guided correction is incorporated from a fast optical flow in compliment to drift-free and robust facial landmark detection. In some instances, as a result of the improved model expressiveness and tracking fidelity, rigid stability is improved by effectively reducing residual expression fitting errors in the optimization.

In some embodiments, the region-based models include adaptive rigidity weighting. The adaptive rigidity weighting enables the region-based models to prioritize different regions for head pose and expression optimizations based on their rigidity during tracking. In some instances, rigid regions are weighted more heavily for head pose optimization. For example, rigid regions may include a forehead or a nose. For plastic, deformable attributes of an object, or expressive portions of a face, more weight may be placed on these regions for expression optimization. Expressive regions of a face may include cheeks, mouth, eyebrows, and eyes. In some embodiments, rigidity weights are automatically inferred from magnitudes of estimated expression parameters during expression optimization. Head pose parameters are re-optimized once rigidity weights have been updated. In some embodiments, such optimization is iteratively and alternatively performed until both optimizations converge. In some embodiments, the adaptive rigidity weighting is derived based on training data. Specifically, an offline training scheme is employed to learn the hyper-parameters for the dynamic rigidity weights (dynamic rigidity prior) by optimizing the convergence of the rigid pose to the ground-truth poses in the training data.

The various embodiments of the present disclosure relate to devices and instructions by one or more processors of a device to perform region-based stabilized object tracking within video streams. In some examples, described herein, such region-based stabilized tracking is described relative to face tracking within a video stream. An object tracking system is described that facilitates stabilized real-time object tracking in a video stream. Some embodiments of the object tracking system use real-time monocular object tracking to improve localized deformation, model expressiveness, and rigidity stability. Some embodiments of the object tracking system apply region-based expression models to perform real-time face tracking with combined sparse landmark and dense motion constraints. Further, some embodiments of the object tracking system use adaptive rigidity weighting on region-based models to improve rigid stability.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third-party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of an object tracking system 160 such that components of the object tracking system 160 configure the client device 110 to perform a specific set of functions with respect to operations of the object tracking system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the object tracking system 160 to enable region-based stabilized object tracking within video streams.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the network system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the object tracking system 160 capable of for region-based stabilized object tracking within video streams. Similarly, the client device 110 includes at least a portion of the object tracking system 160, as described above. In other examples, client device 110 may include the entirety of the object tracking system 160. In instances where the client device 110 includes a portion of (or all of) the object tracking system 160, the client device 110 can work alone or in cooperation with the social messaging system 130 to provide the functionality of the object tracking system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the object tracking system 160 may for region-based stabilized object tracking within video streams. The device may perform the object tracking as a part of a generation of content for an ephemeral message or conducting a communications session between two client devices.

Figure 2:
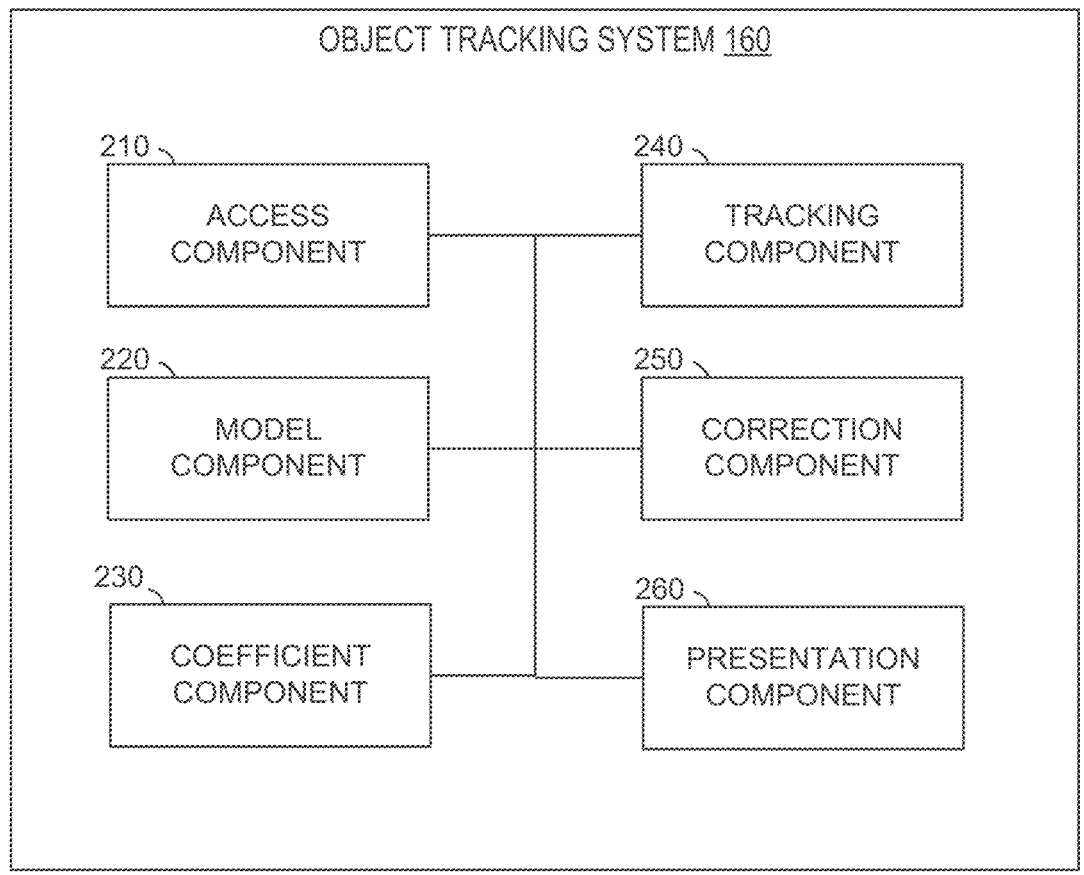
FIG. 2 is a diagram illustrating an object tracking system, according to some example embodiments.

In FIG. 2, in various embodiments, the object tracking system 160 can be implemented as a standalone system or implemented in conjunction with the client device 110, and is not necessarily included in the social messaging system 130. The object tracking system 160 is shown to include an access component 210, a model component 220, a coefficient component 230, a tracking component 240, a correction component 250, and a presentation component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

Figure 3:
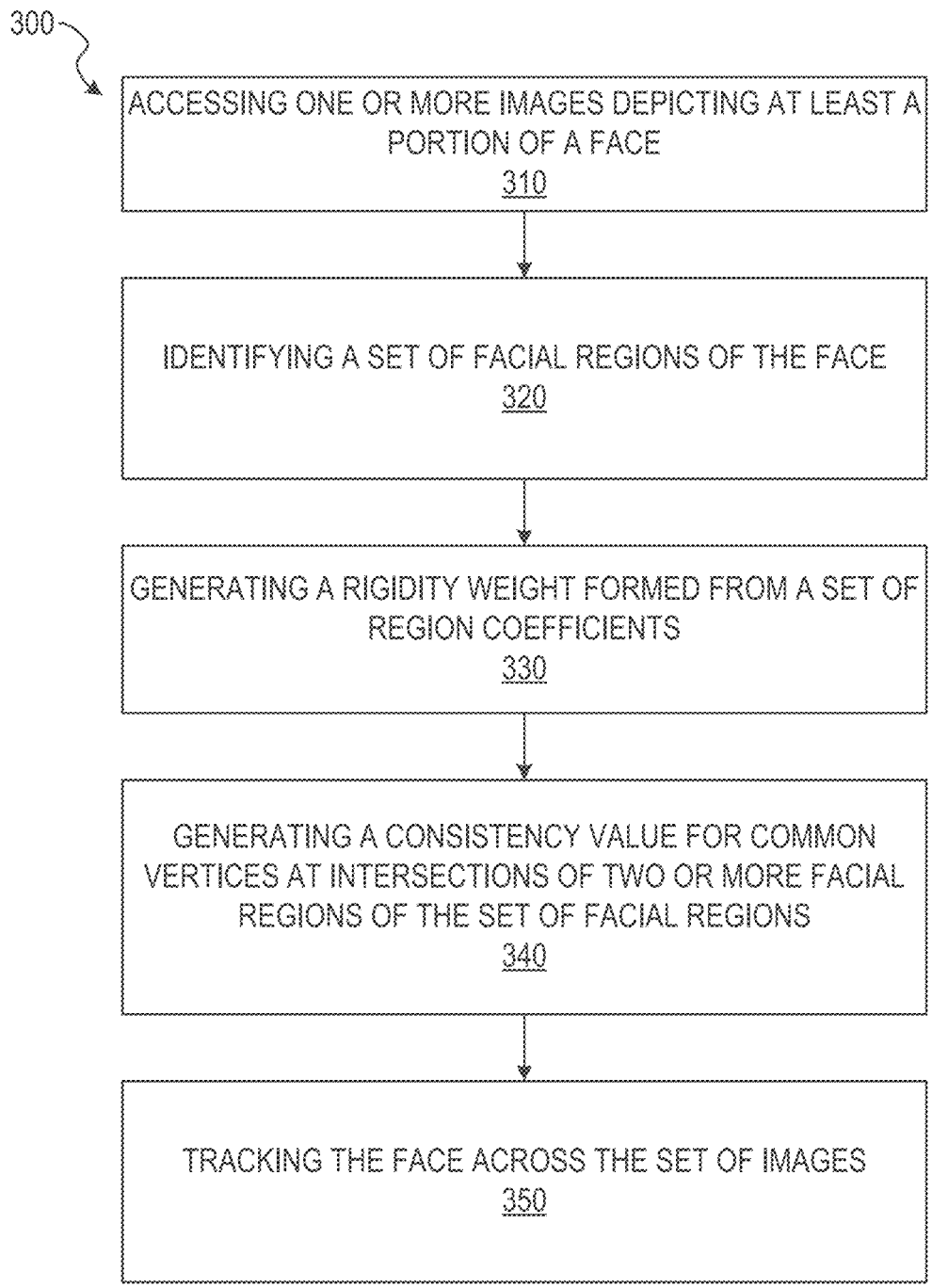
FIG. 3 is a flow diagram illustrating an example method for region-based stabilized object tracking within video streams, according to some example embodiments.

FIG. 3 depicts a flow diagram illustrating an example method 300 for region-based stabilized object tracking within video streams. The operations of method 300 may be performed by components of the object tracking system 160, and are so described below for purposes of illustration. The method 300 may be understood as a rigid stabilization method for real-time monocular 3D face tracking.

In operation 310, the access component 210 receives or otherwise accesses one or more images depicting at least a portion of an object. In some examples described herein, the portion of the object may be at least a portion of a face depicted within the one or more images of a video stream. The one or more images and the portion of the object may be provided as input to one or more components of the object tracking system 160.

In some embodiments, the access component 210 receives the one or more images as a video stream captured by an image capture device associated with the client device 110 and presented on a user interface of a communication application. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the object tracking system 160, as described below in more detail.

Figure 4:
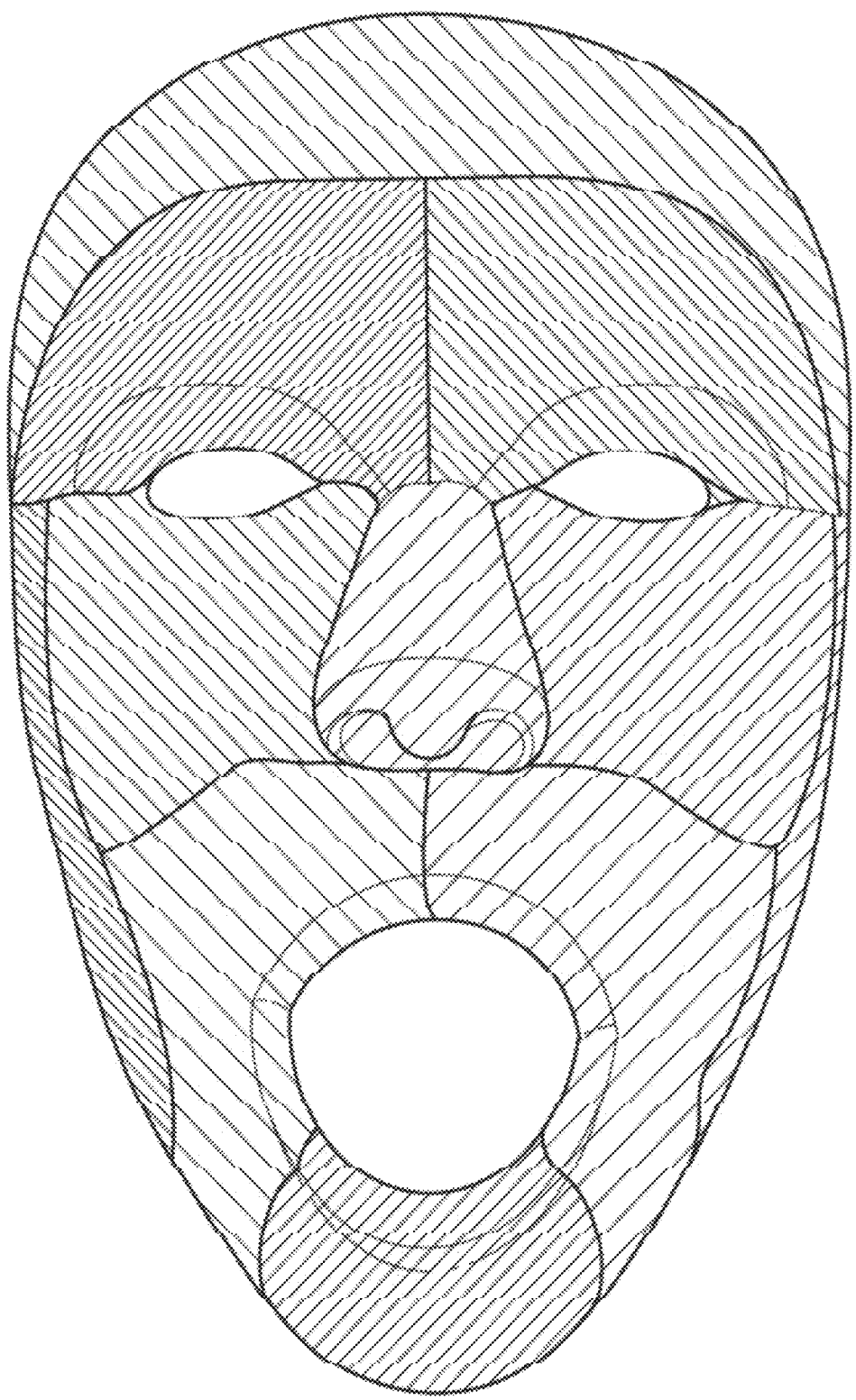
FIG. 4 is a user interface diagram depicting a region-based model of a face, according to some example embodiments.

In operation 320, model component 220 identifies a set of facial regions of the face. In some embodiments, the set of facial regions are represented by FIG. 4. The set of facial regions may be distributed on the portion of the face depicted within the video stream. Each facial region may be a segment of the face within the video stream and may correspond or cover a specified face sub-region which tends to move coherently together. Further, vertices or facial landmarks within a given facial region may share a high correlation with other vertices or landmarks within the same facial region and a weak correlation with vertices or landmarks of other facial regions of the set of facial regions. In some embodiments, the set of facial regions may correspond to points or vertices distributed on the face. For example, the vertices may be or may correspond to facial landmarks on the face or vertices of a mesh. Each facial region of the set of facial regions may intersect another facial region. Intersections between facial regions may occur with at least one common vertex from a set of facial vertices. The set of facial regions and the vertices or facial landmarks may be provided by the model component 220 to one or more components of the object tracking system 160. In some embodiments, the 2D positions of the vertices or facial landmarks are provided as input for components of the object tracking system 160.

The set of facial regions may conform to internal coherence and external independence. Internal coherence indicates that each facial region is or tends to be a local rigid cluster of a surface of an object (e.g., a face) to be tracked. Internal coherence may also be represented by vertices or landmarks within a facial region moving coherently with other vertices or landmarks within the same region. Rigid motion may be estimated for internally coherent facial regions and determine whether the facial region is moving in accordance with the remaining portions of the face outside of the facial region.

External independence indicates that each facial region forms a local sub-expression region. Vertices or landmarks within a facial region may have weak couplings with other vertices or landmarks to enable each facial region to undergo independent expression. Blendshapes may be constructed to ensure the model of the face is more expressive while retaining a visually natural appearance.

In some embodiments, each region of the set of facial regions is treated or generated as an independent model. A blending scheme may be incorporated by the model component 220 to connect the set of regions at vertices representing or proximate to regional boundaries. In some embodiments, each region of the set of facial regions is generated as or treated as a sub-model of a facial model. The sub-models representing the set of facial regions may be solved simultaneously. In some instances, as the sub-models are simultaneously solved, boundary consistency may be enforced. For example, boundary consistency is enforced using a soft least squares approach or set of operations. The soft least squares constraints enable discrepancies at boundaries between facial regions to be corrected and the facial model as a whole to be flexible. In such instances, the flexibility and discrepancy correction enables the set of facial models to form a coherent facial model. Embodiments of the present disclosure may solve for all sub-models simultaneously, while explicitly enforcing boundary consistency in a soft least squares sense. Soft constraints, as described above, allow discrepancies at inter-model boundaries, while keeping the model flexible. The simultaneous solve uses sub-models that form a coherent unit.

In some embodiments, the set of facial regions is segmented prior to receiving the video stream. Sub-models corresponding to the set of facial regions are generated by grouping vertices of a facial mesh or set of facial landmarks. The grouped vertices or landmarks are highly correlated points within the mesh or set of facial landmarks. The regions selected or identified with highly correlated points are compressed by principal component analysis. The vertices of the mesh or the facial landmarks are identified using a set of faces or a previously generated model. In some instances, the vertices of the mesh or the facial landmarks are initially captured using a range of faces and a range of motion, emotions, expressions, or other aspects representative of a face and movement thereof. The vertices or facial landmarks are captured as three-dimensional vertices with corresponding spatial coordinates. The spatial coordinates indicate a measurement of correlation between the vertices or facial landmarks.

In determining correlative value between vertices or landmarks, the model component 220 generates normalized correlation matrices for each vertex or landmark and then averages the correlation matrices into an averaged overall correlation matrix. In the correlation matrix, vertices in the same region are identified as positioned proximate to one another on a surface of the face. In some embodiments, the model component 220 also computes inter-vertex distances on the mesh using an isomap algorithm to form a distance matrix. The correlation matrix and the distance matrix are combined by normalizing the distance matrix and incorporating the two matrices into an affinity matrix.

In a first embodiment for identifying the set of facial regions of the face in operation 320, multi-linear face models may be used as data-driven priors that expand the subspace of realistic face shapes under both identity and expression variations represented by a rank-3 tensor $B \in \mathbb{R}^{3Nm \times Ni \times Ne}$, where Nm, Ni, Ne are the numbers of vertices in the face model and the number of bases for identities and expressions, respectively. Given previously estimated identity parameters n for a current subject and the camera matrix, the corresponding holistic expression blendshape bases can be extracted as: $B=[B_0, B_1, \ldots, B_{Ne}]=\mathcal{B} \otimes \eta$. Without loss of generality, B can be further converted into delta bases by $B=[B_0, \Delta B_1, \ldots, \Delta B_{Ne}]$, where $B_0$ is for the neutral expression or base shape, and $\Delta B_1 = B_i - B_0$. Given expression parameters $\beta=[\beta_1, \ldots, \beta_N]$, the 3D face model can be expressed as:

To fit the 3D face model to input constraints defined in image space, a rigid pose transformation is defined as $T=[R, t] \in \mathbb{R}^{3 \times 4}$ which consists of a rotation matrix $R \in \mathbb{R}^{3 \times 3}$, parametrized by three Euler angles, and a translation vector $t \in \mathbb{R}^3$. The Euler angles associated with T can be denoted as r(T) and the translation vector as t(T). The camera intrinsics can be predetermined and the camera projection operator $\Pi: \mathbb{R}^3 \rightarrow \mathbb{R}^2$ maps from a camera coordinate system to an image coordinate system. The projected face shape can be defined as $P(T, \beta) \in \mathbb{R}^{2 \times Nm}$ under rigid post T and expression parameters $\beta$: $P(T, \beta) = \Pi(TF(\beta))$, where $F \in \mathbb{R}^{4'}$ is F in homogeneous coordinates.

A data-driven approach may be employed to learn the region-based face models based on motion-correlated local clusters in facial performance training data. A similar approach may be employed to generate a region-based face model from real facial performance datasets. Namely, the region-based face model, according to some embodiments, segments the entire face into K spatially-adjacent regions. A collection of registered meshes, each containing $N_M$ vertices, can be retrieved and processed. The training data can contain 150 different identities with each performing 20 different expressions to cover a wide range of identity variations and most common expressions.

A correlation matrix $C \in \mathbb{R}^{Nm \times Nm}$ as well as a distance matrix $G \in \mathbb{R}^{Nm \times Nm}$ over the entire training data for each pair of vertices in the mesh can be computed. The similarity matrix can be computed as $S=(1-\phi)C+\phi G$ where $\phi$ is a weight to balance between correlation and mesh distances in the segmentation. Normalized spectral clustering to S may be performed to determine K clusters, with each cluster representing a local face region $\Gamma^{-k} \sqsubset (1, \ldots, N_m)$. The process ensures that shared vertices between regions are all included in their corresponding region.

In some embodiments, after performing segmentation, principal component analysis (PCA) is not performed in each region to derive a region-based PCA model. Instead, the segmentation results $\{\Gamma^k\}$ is used to directly segment the original multi-linear face model $\beta$ into a region-based multi-linear model $\{B^k\}$. A benefit of this approach is that the semantics of expression blendshapes are preserved so that explicit sparsity regularization on the expression semantics can be enforced. Similar to holistic multi-linear models, online identity adaptation methods can be used to compute identity coefficient vectors $\eta^k$ for each region-based multi-linear model $\beta^k$, to extract region-based blendshapes $B^k = \mathcal{B}^k \otimes \eta^k \in \mathbb{R}^{4N_M^k \times N_E}$. Given $\Delta B_i^k = B_i^k - B_0^k$ and $\beta_k = [\beta_1^k, \ldots \beta_{N_E}^k]$, each region of the face model can be expressed independently as:

$$F^k(\beta^k) = B_{ij}^k + \sum_{i=1}^{N_E} \beta_i^k \Delta B_i^k.$$

The final face is then the combination of the regions $F=[F^1, \ldots, F^K]$. The positions of the shared vertices between the regions may be averaged based on their positions in $F^k$. In total, the face mesh F may contain 1,220 vertices and the number of shared vertices between regions may range from 18 to 46. Similar region-based projected face shares can be defined as $P^k(T, \beta^k) \in \mathbb{R}^{2 \times N_M^k}$ under rigid pose T and expression parameters $\beta^L$: $P^k(T, \beta^k) = \Pi(TF^k(\beta^k))$.

In a second embodiment for identifying the set of facial regions of the face in operation 320, as shown in FIG. 4, an object surface, such as a surface of a face, may be segmented into $n_r$ spatially-adjacent regions. Where the regions are preprocessed, a set of training meshes $n_t$ may be collected or otherwise accessed as training data for object segmentation. The training meshes may be processed to compute symmetric similarity s(i, j) between any pair of vertices. The symmetric similarity may be represented by Equation 1.

$$s(a, b) = \frac{\sum_{i=1}^{n_t}(G_a^i - \overline{G}_a)(G_b^i - \overline{G}_b)}{\left(\sum_{i=1}^{n_t}(G_a^i - \overline{G}_a)^2 \sum_{i=1}^{n_t}(G_b^i - \overline{G}_b)^2\right)^{0.5}} + \phi \exp\left(-\frac{\sum_{i=1}^{n_t}\|G_a^i - G_b^i\|}{\sigma_s n_t}\right). \quad \text{Equation 1}$$

In Equation 1, the first term may measure a motion correlation between two vertices. The second term may penalize large average distances weighted by $\phi$. Normalized spectral clustering may be applied to the similarity matrix formed by s(a, b). Each resulting cluster may represent a local region of the object. After segmentation, a surface of the object may be divided or segmented into $n_r$ regions with each containing a subset of vertices $F^k$. The vertices may correspond to vertices of meshes used for training the region-based model. Vertices located on boundaries between segmented regions may be shared by the neighboring segmented regions. Such vertices may be represented as $\delta(p, q) = F^p \cap F^q$. Each region may contain $n_e$ blendshapes $B^k$. The blendshapes may be constructed to represent a local expression deformation. A corresponding expression coefficient vector $\beta^k$, $F^k$ may be represented independently using Equation 2.

$$F^k = B_0^k + \sum_{i=1}^{n_e} \beta_i^k \hat{B}_i^k . \qquad \text{Equation 2}$$

Returning to FIG. 3, in operation 330, the coefficient component 230 generates a rigidity weight formed from a set of region coefficients. In some embodiments, the rigidity weight is represented as shown below:

$$w_k^r = e^{-m_k^e/\sigma^r}.$$

The rigidity weight may disambiguate rigid and non-rigid motion. In some embodiments, a rigidity weight is generated for each facial region. The set of region coefficients comprise a rigid coefficient and a non-rigid coefficient for each facial region of the set of facial regions. The rigid coefficient may be understood as a rigid six-degrees-of-freedom transformation. The non-rigid coefficient may be understood as a deformation or expression coefficient.

In some embodiments, as described in more detail below, the model component 220 or the coefficient component 230 performs motion-guided rigid correctives and/or segment-wise expression optimization based on the partitioning or segmentation within the set of facial regions. Two embodiments are described for processing the multi-region facial model to optimize rigid pose and motion.

In a first embodiment, a rigid pose optimization is employed. The rigid head post T is first optimized by fixing the expression parameters $\beta = [\beta^1, \ldots, \beta^k]$. Facial landmark detection is employed to provide robust facial landmarks for the optimization. A set of 2D facial landmarks locations are denoted $L = \{L_1, \ldots, L_{NL}\}$ and their subsets $L^k \sqsubset L$ are defined for different regions. A mapping $l(i)$ can be defined to map landmark $L_i$ to its corresponding vertex on the face model. An energy term can be introduced to minimize the $L_2$ norm of the landmark residuals $e_{land}^k$ between the corresponding projected 3D vertex positions on the input image and the landmarks:

$$\varepsilon_{land}^{pose} = \sum_{k=1}^{K} w^k \|e_{land}^k(T, \beta^k)\|^2$$

$$e_{land}^k(T, \beta^k) = [P^k(T, \beta^k)_{l(i)} - L_i]_{\forall i \in L^k}.$$

The $w^k$ is the per-region dynamic rigidity prior that weights different regions for rigid pose optimization based on their estimated rigidity during tracking.

In some cases, the detected landmarks are too sparse to recover the complete motion of the face, especially in regions where landmarks are absent (e.g., the cheek regions). In such circumstances, besides landmark locations, other denser motion cues may be leveraged to extract true local motion and to correct landmark detection errors. In on example, a fast optical flow estimation method is employed on the input video stream inside the face region on-the-fly to extract dense motion flow and then map this motion flow to each face vertex projection in the screen space through bilinear interpolation, annotated by $U_i$. Given rigid pose T' and expression coefficients B' from a previous frame, the $L_2$ norm of the flow residuals, $e_{flow}^k$ between the current projections of each face vertex I and the flow-predicted locations $P^k(T', \beta'^k)_i + U_i$, should be minimized:

$$\varepsilon_{flow}^{pose} = \sum_{k=1}^{K} w^k \|e_{flow}^k(T, \beta^k)\|^2$$

$$e_{flow}^k(T, \beta^k) = [P^k(T, \beta^k)_i - P^k(T', \beta'^k)_i - U_i]_{\forall i \in \Gamma^k}$$

The dynamic rigidity weights $w^k$ with current dense motion flow U may be used to enforce stronger stabilization to still frames while relaxing restrictions on fast moving frames. The rigid motion weight $\gamma$ can be defined as $$\gamma = \exp\left(-\frac{1}{\sigma_\gamma^2} \sum_{k=1}^{K} \frac{w^k}{|\Gamma^k|} \sum_{i \in \Gamma^k} \|U_i\|^2\right),$$

where $\sigma_\gamma = 10.0$. Given $w_a$, a temporal energy term is introduced to regularize pose optimization from previous pose estimate T': $\varepsilon_{temp}^{pose} = \gamma(\|r(T) - r(T')\|^2 + \delta\|t(T) - t(T')\|^2)$ where S=0.01. The final rigid pose optimization objective can be defined as the linear combination of the energy terms to solve for $$\hat{T}: \hat{T} = \arg\min_{T} \sum_{*} \lambda_*^{pose} \varepsilon_*^{pose},$$

where $\lambda_{land}^{pose} = 1.0$, $\lambda_{flow}^{pose} = 0.8$, $\lambda_{temp}^{pose} = 2.0$.

In a second embodiment, the coefficient component 230 temporarily regularizes rigid coefficients to stabilize tracking results. In this case, the coefficient component 230 adapts regularization weights with current rigid motion to enforce stabilization to still frames. This embodiment also relaxes restrictions to fast moving frames. In this embodiment, the coefficient component 230 estimates an average rigid motion magnitude $m^m$ across all regions of the set of regions. The rigid motion magnitude may be represented by Equation 3.

$$m^m = \frac{\sum_{k=1}^{n_r} \sum_{i \in F^k} w_k^r \|U_i\|}{\|F\|_0}. \qquad \text{Equation 3}$$

The adaptive regularization weight may be defined in a manner similar to a rigid corrective weight. In some embodiments, the adaptive regularization weight may be represented by Equation 4.

$$w^a = e^{-m^m/\alpha_a}. \qquad \text{Equation 4.}$$

Given the adaptive regularization weight above, an adaptive regularization energy may be represented by Equation 5.

$$E_{reg}^{rigid} = w^a(\|R^* - R^2\|^2 + \delta\|t^* - t\|^2).$$ Equation 5

The above-referenced terms may be integrated into a rigid optimization framework defined to minimize an energy function represented by Equation 6.

$$E^{rigid} = \lambda_{lan} E_{lan} + \lambda_{cor} E_{cor}^{rigid} + \lambda_{reg} E_{reg}^{rigid}.$$ Equation 6

In operation 340, the correction component 250 generates a consistency value for common vertices at intersections of two or more facial regions of the set of facial regions. In some embodiments, the common vertices or boundary vertices between neighboring regions are blended to ensure region structure is maintained, while reducing error at intersections between regions and enabling more accurate or natural tracking and presentation of the object. The consistency value may be understood as a soft consistency term. The soft consistency term is used to merge split vertices into averaged positions. The consistency value may be represented by Equation 7.

$$E_{con}^{exp} = \sum_{(a,b)\in\partial(p,q)} \|F_{M(a)}^p - F_{M(b)}^q\|^2.$$ Equation 7

As described in more detail below, region-wise dense motion flow may be incorporated to increase robustness and accuracy. Non-rigid corrective energy may be represented by Equation 8.

$$E_{cor}^{exp} = \sum_{k=1}^{n_r} \sum_{i \in F^k} (1 - w_k^r)\|P(\mathcal{T}, \beta^k)_i - P(\mathcal{T}^*, \beta^{k*})_i - U_i\|^2.$$ Equation 8

In operation 350, the tracking component 240 tracks the face across the set of images. In some embodiments, the face is tracked based on the set of facial regions and the rigidity weight of each facial region.

Figure 5A:
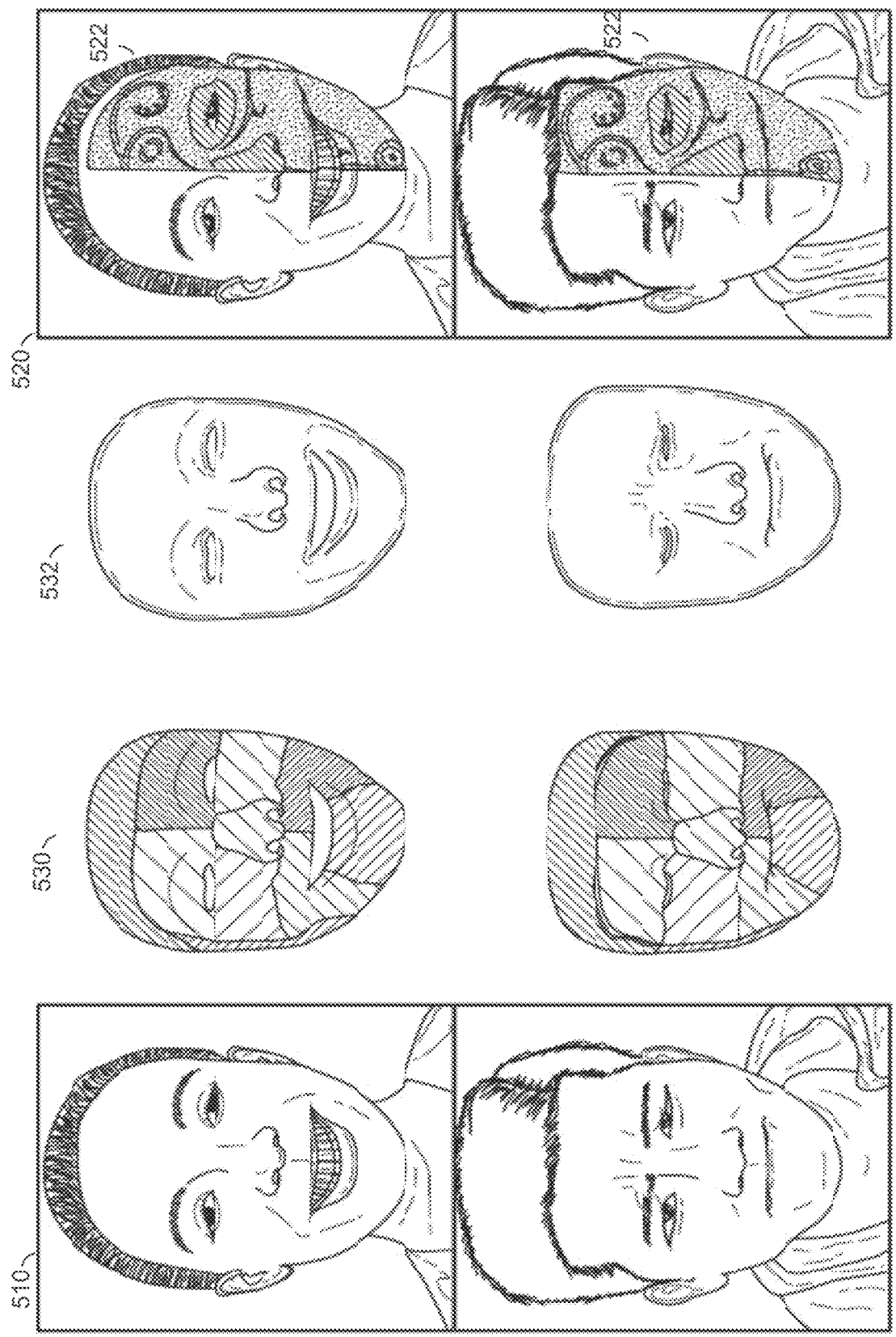
FIGS. 5A and 5B are a user interface diagram depicting stages of region-based modeling of a face, according to some example embodiments.
Figure 5B:
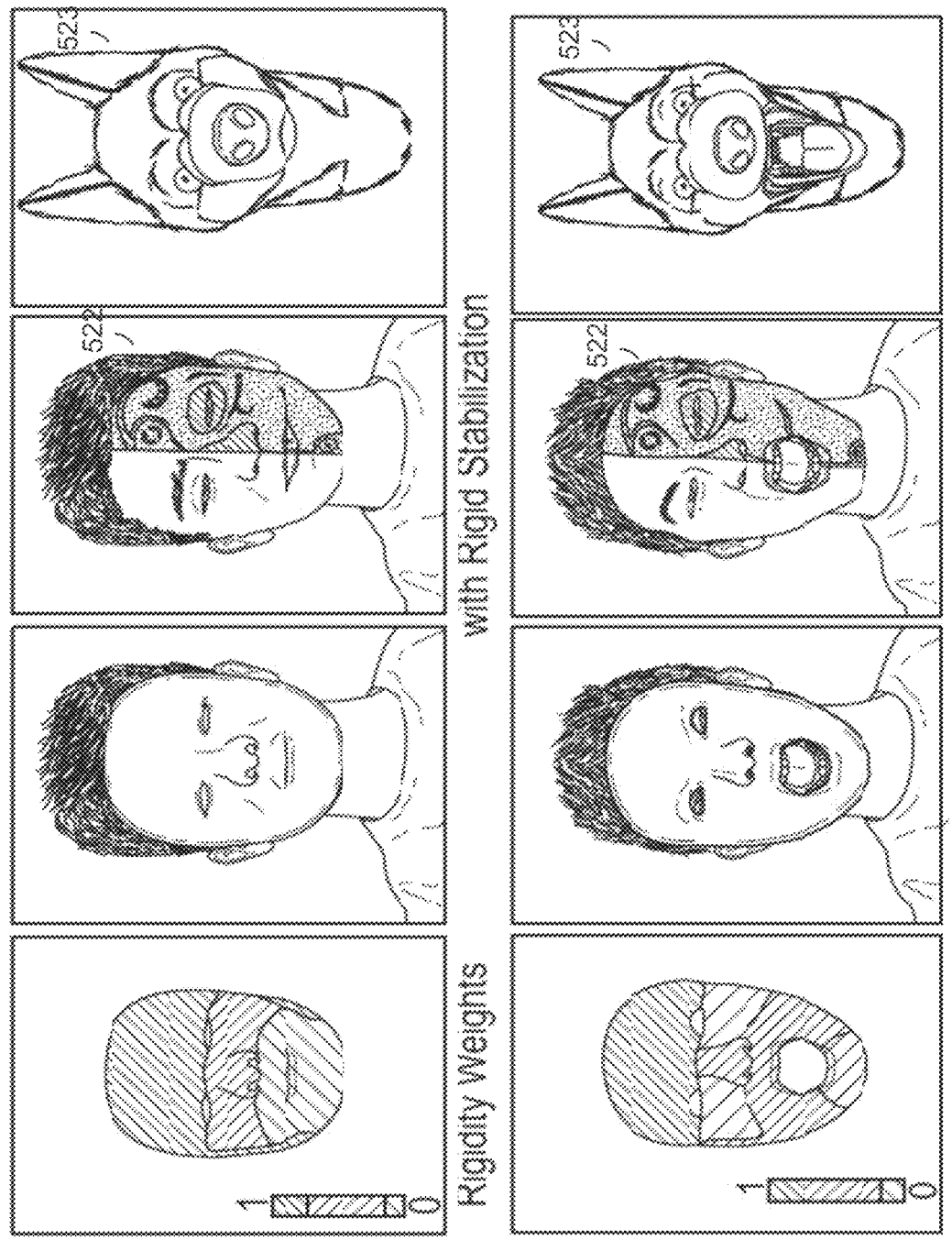

As shown in FIGS. 5A and 5B and described above, the object tracking system 160 receives images or frames 510 of a video stream as input in operation 310. The object tracking system 160 generates, applies, or identifies region-based object tracking models 530 to track local expression or deformation. The object tracking system 160 produces a stabilized 3D shape or model 532 of the object to act as a skin or texture. The object tracking system 160, while tracking the object in the video stream, may cause the presentation component 260 to present graphical elements 520 (e.g., virtual makeup 522 shown in FIG. 5A), augmented reality elements (e.g., an avatar 523 shown in FIG. 5B), stickers, textures, colors, or any other suitable graphical representation or modification on or proximate to a surface of the object being tracked. Similarly, the presentation component 260 may cause presentation of graphical elements, temporary or persistent, relative to the surface of the object and based on tracking of the object.

Virtual makeup 522 may result in appearance of a face having accentuations or drawings or other graphical changes that appear to overlay the skin of the face. For example, the virtual makeup 522 may cause a change in color or addition of a drawing to/on a portion of a face, depicted in an image of a received video, where the change in color or drawing being added does not exist in the real-world face being captured and shown in the video. The virtual makeup 522 may change the skin color of all or a target region (which may be selected by a user or automatically selected) of a face being depicted in a video with a new skin color such as to overlay the new skin color over all or the region of the face that was captured in the original video to provide an augmented or changed video featuring the face with the new skin color.

In some embodiments, after estimating the rigid pose in each iteration, the expression parameter B is optimized. Similar energy formulation as rigid pose can be employed to optimize expression parameters without the rigidity weights $w^k$:

$$\varepsilon_{land}^{expr} = \sum_{i=1}^{N_L} \sum_{i \in \mathcal{L}^k} \|e_{land}^k(T, \beta^k)_i\|^2.$$

Dense motion flow may be incorporated to improve expression parameter estimates. The dense flow energy term may be defined as:

$$\varepsilon_{flow}^{expr} = \sum_{k=1}^{K} \sum_{i \in \Gamma^k} \|e_{flow}^k(T, \beta^k)_i\|^2.$$

A similar temporal energy term can be utilized to regularize expression optimization from the previous expression estimates B': $\varepsilon_{temp}^{expr} = \|\beta - \beta'\|^2$. Since expression blendshapes are not linearly independent, favoring a sparse representation may reduce fitting errors and enable higher-fidelity retargeting of face animations. A robust $L_1$-norm regularization penalty may be used to encourage sparsity:

$$\varepsilon_{l1}^{expr} = \sum_{k=1}^{K} \sum_{i=1}^{N_E} \|\beta_i^k\|_1.$$

To handle boundary vertices between neighboring regions to preserve per-region structure while achieving seamless blending across region boundaries, a soft consistency term is enforced and the shared vertices are merged into the average positions. The across-region consistency term can be defined as:

$$\varepsilon_{bound}^{expr} = \sum_{i \in \Gamma^p \cap \Gamma^q} \|F^p(\beta^p)_i - F^q(\beta^q)_i\|^2.$$

Finally, the linear combination of the energy terms is minimized for the expression parameters $$\hat{\beta}: \hat{\beta} = \underset{\beta}{\operatorname{argmin}} \sum_* \lambda_*^{expr} \varepsilon_*^{expr},$$

where $\lambda_{land}^{expr} = 1.0$, $\lambda_{flow}^{expr} = 0.3$, $\lambda_{temp}^{expr} = 5.0$, $\lambda_{l1}^{expr} = 2.0$, and $\lambda_{bound}^{expr} = 3.0$.

In another embodiment, temporal coherence energy is introduced as a term to regularize expression optimization from previous expression estimates. The temporal coherence energy may be represented as: $\varepsilon_{temp}^{expr} = \|\beta - \beta'\|^2$.

In some embodiments, a rigid motion weight is used with dense flow motion to enforce stronger stabilization to still frames. Rigid motion weights may be represented in an equation, such as:

$$w_a = \exp\left(-\frac{\sum_{k=1}^{K}\sum_{i\in\Gamma^k} w^k \|U_i\|}{\sigma_a \|F\|_0}\right).$$

Given the rigid motion weight $w_a$, a temporal energy term is provided to regularize pose optimization from a previous pose estimate and is represented as:

$$\varepsilon_{temp}^{pose} = w_a(\|R(T)-R(\tilde{T})\|^2 + \delta\|t(T)-t(\tilde{T})\|^2),$$

Landmark energy may also be employed in rigid pose optimization. An energy term may be introduced based on a 2D facial landmark location and a mapping of a landmark to a corresponding vertex. The landmark energy may be represented as:

$$\varepsilon_{land}^{pose} = \sum_{i=1}^{N_L} \|P(T,\beta)_{f(i)} - L_i\|^2.$$

A final pose energy, a final rigid pose optimization, may be defined as a linear combination of aforementioned energy terms and represented as:

$$T^* = \arg\min_T \sum_* \lambda_*^{pose} \varepsilon_*^{pose}.$$

In some instances, expression optimization includes temporal coherence energy, L1 sparsity energy, boundary consistency energy, landmark energy, and dense flow energy. L1 sparsity energy may be represented as:

$$\varepsilon_{l1}^{expr} = \sum_{k=1}^{K}\sum_{i=1}^{N_E} \|\beta_i^k\|_1.$$

Boundary consistency energy may be represented as:

$$\varepsilon_{bound}^{expr} = \sum_{i\in\Gamma^p\cap\Gamma^q} \|F^p(\beta^p)_i - F^q(\beta^q)_i\|^2.$$

In such embodiments, a final expression energy, minimizing linear combination of the above-referenced energy terms for optimized expression parameters, is represented as:

$$\beta^* = \arg\min_\beta \sum_* \lambda_*^{expr} \varepsilon_*^{expr},$$

After expression optimization, adaptive rigidity weighting may dynamically prioritize different regions for rigid pose optimization in further iterations, according to their expression magnitude. The optimizations may be alternated until convergence.

In certain cases, rigid instability arises from ambiguities in the observed facial motion by either the head pose or expression changes. For example, a face scrunching expression moves the central face region landmarks in a way similar to moving the head back. However, landmarks around the edge of the face do not suffer from the same ambiguity during this expression. To address this problem, a dynamic rigidity prior assigns higher weights to regions at run-time which are more likely to give a reliable pose estimate during pose optimization. Training data and an objective function may be utilized to learn and determine this dynamic rigidity prior in an offline training stage.

In some implementations, to account for the varying reliability of different face regions for rigid pose optimization, a dynamic rigidity prior $\{w^k\}$ is used that dynamically weights each region of the face for more reliable rigid pose optimization. The dynamic rigidity prior is formulated based on the expression motion of each region $F^k(B^{tk})$ as compared to its neutral expression base shape $B_0^K$ after the expression optimization:

$$w^k = \alpha^k \exp\left(-\frac{\|F^k(\hat{\beta}^k) - B_0^k\|^2}{(\sigma^k)^2 |\Gamma^k|}\right),$$

where $\alpha^k$ and $\sigma^k$ are learned hyper-parameters and $|\Gamma^k|$ is the number of vertices in the $k^{th}$ region. Less neutral expressions tend to lead to greater post instability and thus regions with greater non-rigid deformations may be down-weighted more.

The training data used to determine the dynamic rigidity prior include landmark and flow measurements, with ground-truth rigid poses and expressions. Since real data with ground-truth rigid poses and expressions is hard to acquire, in one example, the training data is generated by employing artists to build 8 synthetic facial animation sequences, including talking and changing between different expressions. To each of these facial animation sequences, two different rigid transformations are applied, one captured from recorded video, the other a static head pose, creating 16 expression and pose sequences with 2668 frames in total. For each frame of these video sequences, the ground-truth expression coefficients and rigid pose are provided. Based on these data, the ground-truth facial landmarks and motion flow of each vertex are generated.

The goal in determining the dynamic rigidity prior is to find the hyper-parameters $\theta=(\alpha_k, \sigma_k)_{k=1}^K$ in $\{w^k\}_{k=1}^K$ for each face region. The training objective is set to find $\theta$ such that when $$\tilde{T} = \arg\min_T \sum_* \lambda_*^{pose} \varepsilon_*^{pose},$$

is minimized on real data from a perturbed pose $\tilde{T}^s$ and expression $\tilde{B}^s$ of each sample s, it converges as close to the ground-truth pose $T^{*s}$ as possible:

$$\varepsilon_{train} = \sum_{s=1}^{S} \left\| d\left(\arg\min_{\tilde{T}^s} \varepsilon_{train}^{pose}(\tilde{T}^s, \tilde{\beta}^s), T^{*s}\right)\right\|^2$$

$$\varepsilon_{train}^{pose}(T,\beta) = \|e(T,\beta)\|^2,$$

-continued $$e(T, \beta) = \begin{bmatrix} e_{land}(T, \beta) \\ e_{flow}(T, \beta) \end{bmatrix},$$

$$e_{land}(T, \beta) = \left[ \sqrt{w^k \lambda_{land}^{pose}} \, e_{land}^k(T, \beta) \right]_{\forall k \in \{1, \ldots, K\}},$$

$$e_{flow}(T, \beta) = \left[ \sqrt{w^k \lambda_{flow}^{pose}} \, e_{flow}^k(T, \beta) \right]_{\forall k \in \{1, \ldots, K\}},$$

where $d(\cdot, \cdot)$ computes a distance in pose space. This is possible to determine from the synthetic training data. The temporal coherence energy $\varepsilon_{temp}^{pose}$ may be ignored so that the rigidity prior learns to generate the best pose possible independent of previous frames.

In order to make the minimization of this expression tractable, each minimization is approximated over pose within it by one Gause-Newton step: $\delta T^s = -J^+ e(\tilde{T}^s, \tilde{\beta}^s)$ where J is the Jacobian matrix of residual vector e differentiated with respect to $\tilde{T}^s$, and $J^+ = (J^T J)^{-1} J^T$ is the pseudo-inverse of J. Letting $\Delta T^s = T^{*s} - \overline{T}^{-s}$, this produces the following training energy:

$$\varepsilon'_{train} = \sum_{s=1}^{S} \| \delta T^s - \Delta T^s \|^2$$

$$= \sum_{s=1}^{S} \| J^+ e(\tilde{T}^s, \tilde{\beta}^s) + \Delta T^s \|^2$$

$$= \sum_{s=1}^{S} \| J^+ (e(\tilde{T}^s, \tilde{\beta}^s) + J \Delta T^s) \|^2,$$

Intuitively, this objective encourages convergence to the ground-truth pose by enlarging the basin of convergence. The matrix $J^+$ transforms the cost function from one minimizing measurement errors to one minimizing pose errors. However, it may be desirable to drop the conditioning of $J^+$ from this equation so that the optimization is formulated in the domain of measurement errors:

$$\varepsilon''_{train} = \sum_{s=1}^{S} \| e(\tilde{T}^s, \tilde{\beta}^s) + J \Delta T^s \|^2,$$

$$= \sum_{s=1}^{S} \sum_{k=1}^{K} w^k (\lambda_{land}^{pose} \| e_{land}^k(\tilde{T}^s, \tilde{\beta}^s) + J_{land}^k \Delta T^s \|^2 +$$

$$\lambda_{flow}^{pose} \| e_{flow}^k(\tilde{T}^s, \tilde{\beta}^s) + J_{flow}^k \Delta T^s \|^2),$$

where $J^{k*}$ are the parts of the Jacobian specific to the * features of the $k^{th}$ region. The value in the braces is constant, making training very efficient. Finally, the hyper-parameters $\Theta$ are obtained by $$\Theta = \arg\min_{\Theta} \varepsilon''_{train}.$$

The objective is minimized offline until convergence using Ceres. In addition, to avoid the trivial solution that $w^{k,s}=0$, the normalization constraint is enforced to have the weights sum up to one for each sample: $\forall s, \Sigma_{k=1}^{K} w^{k,s} = 1$.

Figure 6:
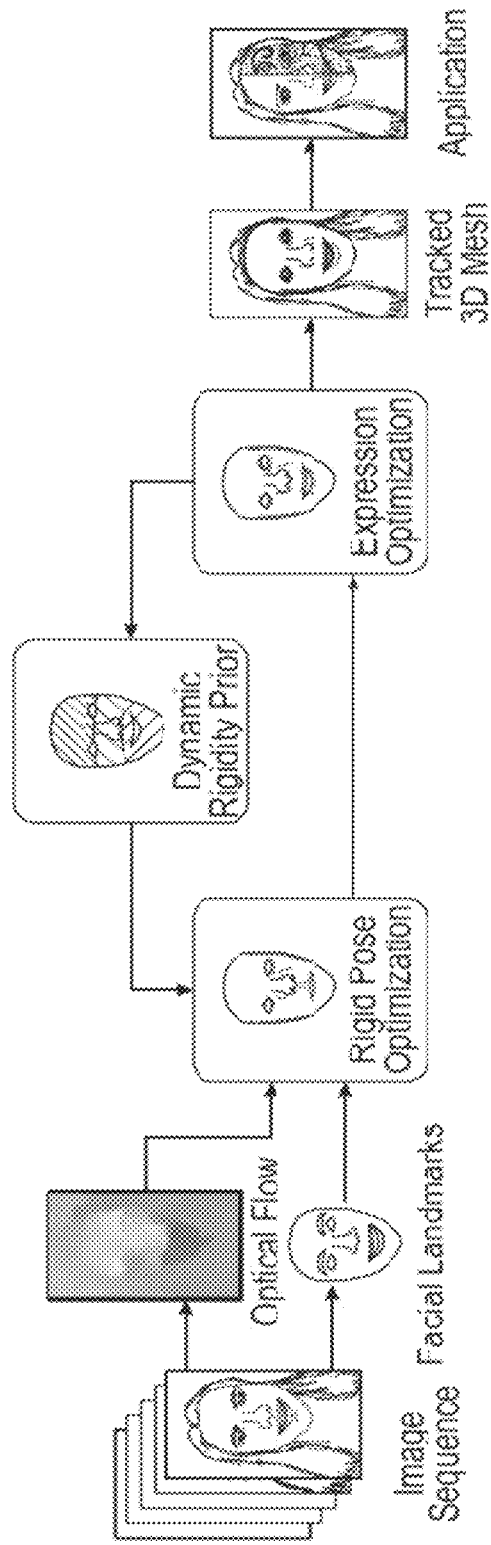
FIG. 6 is a graphical representation of a region-based model object tracking, according to some example embodiments.

FIG. 6 is a graphical representation of embodiments of the methods described herein, such as the method 300, method 900, and method 600. In some embodiments, the input is received as a sequence of images (e.g., a video). Following receipt of the images, facial landmark detection and dense optical flow computation are performed to densify target constraints. A region-based face model, learned from real facial performance datasets, is then fit to the landmarks and optical flow constraints. Using the region-based model, learned from real facial performance datasets, the object tracking system 160 solves for rigid pose parameters and expression parameters in alternating optimizations. During rigid pose optimization, expression or non-rigid parameters are fixed while rigid pose parameters for various constraints, including landmark, motion flow, and temporal coherence are determined. During expression optimization, rigid pose parameters are fixed and optimized expression parameters for constraints including landmark, motion flow, temporal coherence, parameter sparsity, and boundary consistency are determined. Rigid stabilization is achieved by incorporating dynamic rigidity prior during rigid pose optimization, which dynamically weights different regions of the face model as a function of their expression magnitudes. In an offline training step, hyper-parameters of the dynamic rigidity prior are learned and determined for each region by optimizing the convergence of rigid post optimization to the ground-truth poses in a realistic facial performance dataset.

Figure 7:
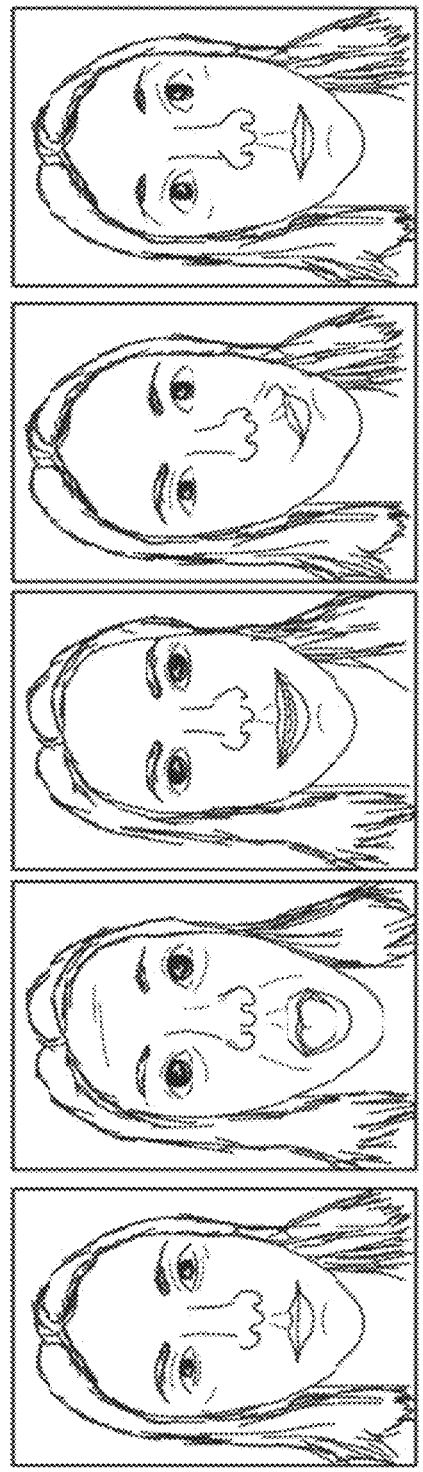
FIG. 7 is a graphical representation of region-based weights in differing frames of a video stream, according to some example embodiments.
Figure 7:
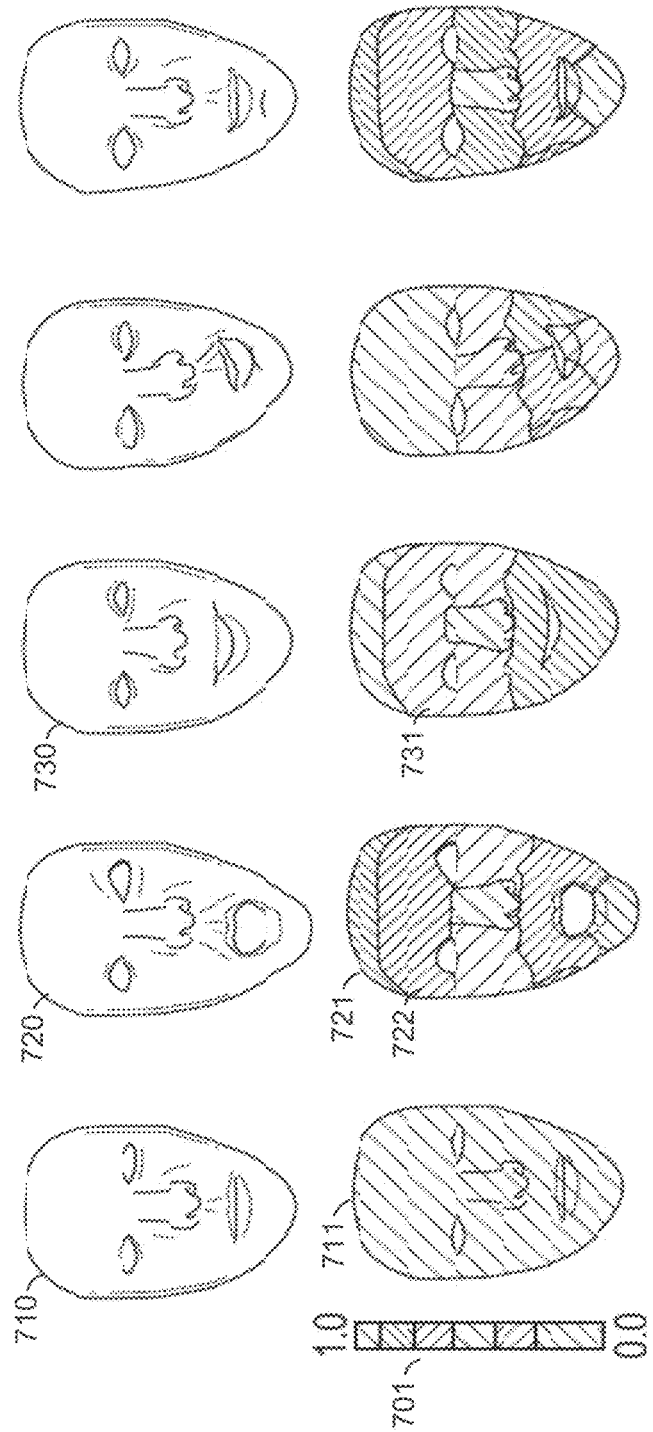

FIG. 7 is a graphical representation of region-based weights in differing frames of a video stream, according to some example embodiments, such as the method 300, method 900, and method 600. In some embodiments, the input is received as a sequence of images (e.g., a video). Following receipt of the images, facial landmark detection and dense optical flow computation are performed to densify target constraints. Different weights are assigned to different facial regions. For example, rigid facial regions may be assigned greater weights (e.g., a weight of 1.0) than flexible or non-rigid regions (e.g., which may be assigned a weight of 0.0). As shown in FIG. 7, legend 701 represents the values associated with various symbols that are assigned to different portions of the face. The face 710 is initially all assigned high value weights as shown by the weight distribution 711 for face 710 to determine the head pose. Then the face 720 is segmented and low value weights are assigned to the nose region (e.g., a non-flexible region) and high value weights are assigned in varying degrees to the eyes, mouth, and chin, as shown by weight distribution 721. This results in tracking those regions of the face with the high value weights separately and with greater effect on the model than those regions of the face with low value weights. Next, some of the face regions of face 730 that were previously assigned high value weights (e.g., the forehead and eye region) as shown in weight distribution 722 (e.g., by lines having a first pattern) are assigned lower value weights as shown in weight distribution 731 (e.g., by lines having a second pattern different from the first pattern) and tracking and modeling is adjusted accordingly. The effect of having lower value weights assigned to certain segments of the face is faster convergence and optimization of the facial modeling as the sequence of images is processed.

Embodiments of the present disclosure may be used in stabilized face tracking systems. Stabilized face tracking systems enable multiple-facial performance driven applications, such as real-time avatar animation, live video face shape manipulation, and virtual makeup. The multiple-facial performance driven applications may be sensitive to rigid tracking accuracy, while the accurate rigid motion and expression deformation of presently presented embodiments may enable application of virtual makeup and other graphical effects to a face/image and produce more robust and realistic results than previous methods.

Figure 9:
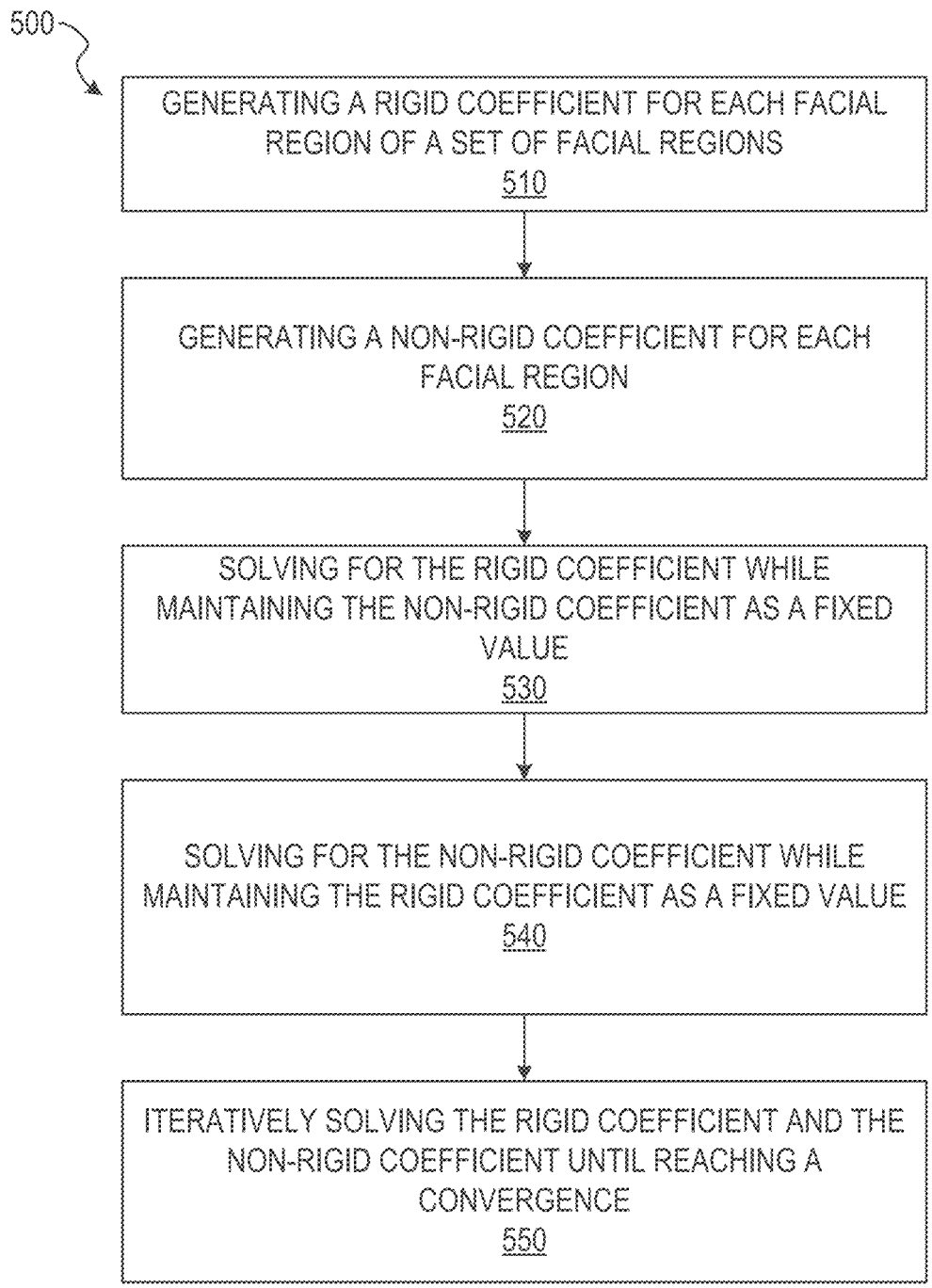
FIG. 9 is a flow diagram illustrating an example method for region-based stabilized face tracking within video streams, according to some example embodiments.

FIG. 9 depicts a flow diagram illustrating an example method 900 for region-based stabilized object tracking within video streams. The operations of method 900 may be performed by components of the object tracking system 160. In some instances, certain operations of the method 900 may be performed using one or more operations of the method 300 or as sub-operations of one or more operations of the method 300, as will be explained in more detail below.

In operation 910, the coefficient component 230 generates a rigid coefficient for each facial region. In one example, the rigid coefficient is a rigid transform, with each facial region of the set of facial regions having a distinct rigid coefficient.

In operation 920, the coefficient component 230 generates a non-rigid coefficient for each facial region. In one example, the non-rigid coefficient is an expression or deformation coefficient, with each facial region of the set of facial regions having a distinct non-rigid coefficient.

In operation 930, the coefficient component 230 solves for the rigid coefficient while maintaining the non-rigid coefficient as a fixed value. In some embodiments, the coefficient component 230 solves for the rigid coefficient for each facial region. Once the rigid coefficient and the non-rigid coefficient have been generated, the coefficient component 230 solves for the rigid coefficient by fixing or holding constant a value of the non-rigid coefficient (e.g., a value of a current expression coefficient). For example, where the object is a face, solving for the rigid coefficient and maintaining the non-rigid coefficient enables factoring out a global head motion and aligning the region-based 3D model to a current frame or image of the video stream. If a remaining discrepancy exists, the discrepancy is fitted by non-rigid expression deformation. In some embodiments, the rigid pose is optimized by minimizing a total landmark fitting error.

In operation 940, the coefficient component 230 solves for the non-rigid coefficient while maintaining the rigid coefficient as a fixed value. In some embodiments, the coefficient component 230 solves for the non-rigid coefficient for each facial region.

In operation 950, the coefficient component 230 iteratively solves for the rigid coefficient and the non-rigid coefficient until reaching a convergence. In one example, the coefficient component 230 iteratively solves for the coefficients for each facial region until reaching a convergence of coefficients for each facial region. In some embodiments, the iterative solving of rigid and non-rigid coefficients is performed in an alternating manner. In such instances, the coefficient component 230 solves for a first coefficient (e.g., the rigid coefficient), and then solves for a second coefficient (e.g., the non-rigid coefficient). Each time a coefficient has been solved or generated by the coefficient component 230, the coefficient component 230 then solves for the alternative or other coefficient. In some embodiments, during each iteration, the coefficients are optimized one after the other. While one coefficient is subject to solving operations, the other coefficient may remain fixed.

Figure 8:
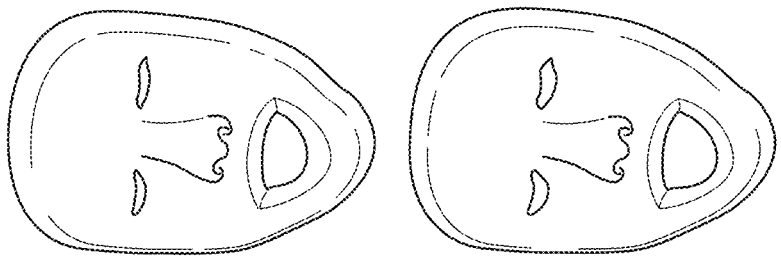
FIG. 8 is a graphical representation of sparse optimization with iteratively-reweighted least-squares, according to some example embodiments.
Figure 8:
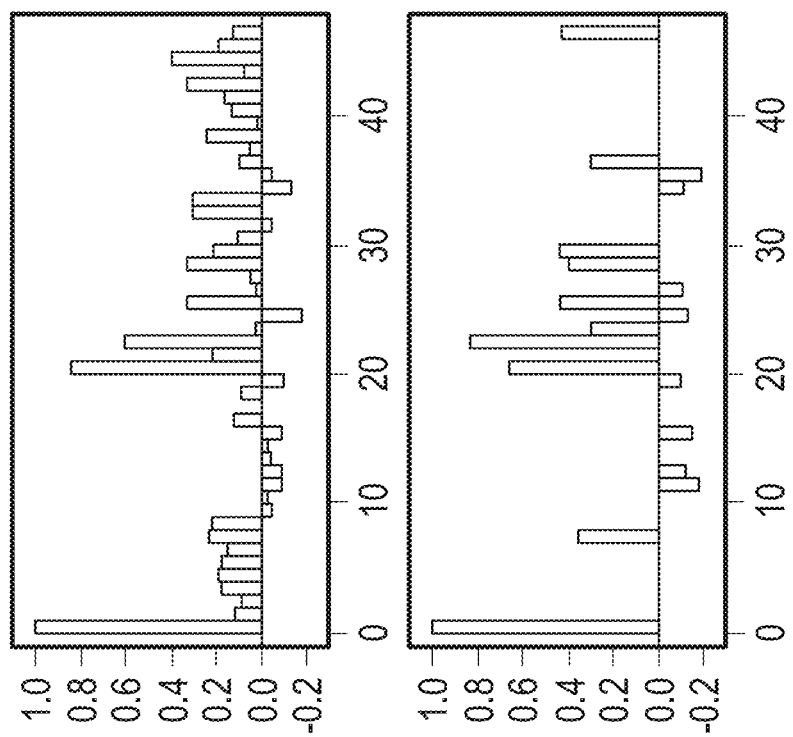
Figure 8:

In some embodiments, the coefficient component 230 iteratively solves for the rigid coefficient and the non-rigid coefficient using an iteratively-reweighted least-squares (IRLS) solver to enforce a robust $L_1$-norm regularization penalty. FIG. 8 provides a representation of sparse optimization with IRLS. The robust $L_1$-norm regularization penalty may be enforced while posing minimal or theoretically minimal influence to model expressiveness while maintaining run-time performance. Such regularization may be represented by Equation 9.

$$E_{reg}^{exp} = \sum_{k=1}^{n_r} \sum_{i=1}^{n_e} \|\beta_i^k\|_1.$$

Equation 9

Approximating IRLS may be done by iteratively solving the whole system and updating weights or coefficient values after each iteration. Iterative solving may be represented by Equation 10, wherein $\beta^*$ are the solutions of a last or previous iteration.

$$E_{reg}^{exp} = \sum_{k=1}^{n_r} \sum_{i=1}^{n_e} \frac{1}{\|\beta_i^{k*}\|_2} \|\beta_i^k\|_2^2.$$

Equation 10

An expression optimization energy of the above may be represented by Equation 11.

$$E^{exp} = \lambda_{lan} E_{lan} + \lambda_{con} E_{con}^{exp} + \lambda_{cor} E_{cor}^{exp} + \lambda_{reg} E_{reg}^{exp}.$$

Equation 11

Figure 10:
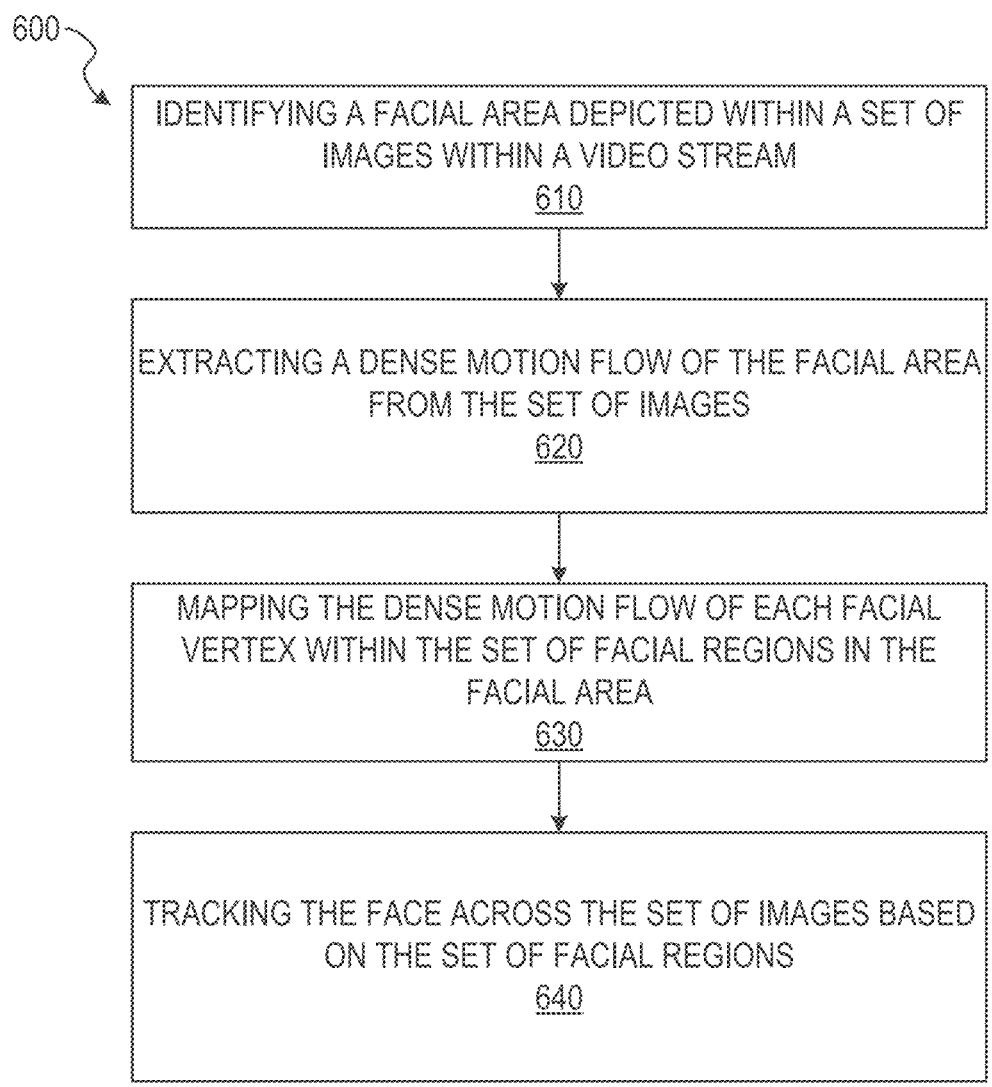
FIG. 10 is a flow diagram illustrating an example method for region-based stabilized face tracking within video streams, according to some example embodiments.

FIG. 10 depicts a flow diagram illustrating an example method 600 for region-based stabilized object tracking within video streams. The operations of method 600 may be performed by components of the object tracking system 160. In some instances, certain operations of the method 600 may be performed using one or more operations of the method 300 or the method 900 or as sub-operations of one or more operations of the method 300 or the method 900, as will be explained in more detail below.

In operation 610, the model component 220 identifies a facial area depicted within the set of images of the video stream. In some embodiments, the facial area includes the set of facial regions. The facial area is generally detected based on identification of a face and a facial area of the face within the video stream. The facial area is detected or identified using any suitable operation or set of operations, such as object recognition, facial recognition, shape recognition, edge detection, identification of vertices within a mesh corresponding to the object, or any other suitable manner.

In operation 620, the tracking component 240 extracts a dense motion flow of the facial area from the set of images. In some embodiments, tracking an object using a mesh or object landmarks (e.g., facial landmarks), is enhanced using dense motion flow. In such embodiments, fast optical flow estimation is applied on the video stream or the one or more images comprising the video stream. The fast optical flow estimation is applied inside the facial area on-the-fly to extract the dense motion flow. In some embodiments, dense flow energy includes denser motion cues to help extract true local motion and correct landmark detection errors. Dense flow energy may be represented by the equation:

$$\varepsilon_{flow}^{pose} = \sum_{k=1}^{K} \sum_{i \in \Gamma^k} w^k \|P(T, \beta)_i - P(\tilde{T}, \tilde{\beta})_i - U_i\|^2,$$

Further, in expression optimization, dense flow energy may be represented as a term:

$$\varepsilon_{flow}^{expr} = \sum_{k=1}^{K} \sum_{i \in \Gamma^k} \|P(T, \beta^k)_i - P(\tilde{T}, \tilde{\beta}^k)_i - U_i\|^2.$$

In operation 630, the tracking component 240 maps the dense motion flow to each facial vertex within the set of facial regions in the facial area. In one example, aspects of the dense motion flow are mapped to each vertex of a mesh projected over the object in a screen space. The mesh or the vertices may be projected using bilinear interpolation. Given rigid parameters or coefficients and non-rigid parameters or coefficients from a previously received frame of the video stream, the tracking component 240 initiates tracking of the object.

The dense motion flow generates an approximation of a local object motion. An expression magnitude $m_k^e$ may also be calculated for each region of the set of regions. The expression magnitude measures a total non-rigid coefficient (e.g., expression coefficient) magnitude. Such non-rigid coefficient magnitude may exclude a neutral expression or deformation on individual or multiple regions. In some embodiments, the expression magnitude may be represented by Equation 12.

$$m_k^e = \sum_{j=1}^{n_e} \beta_j^k,$$ Equation 12

Using the dense motion flow and the rigid weight, the components of the object tracking system 160 may generate a motion-guided rigid corrective energy. Such an energy may be represented by Equation 13.

$$E_{cor}^{rigid} = \sum_{k=1}^{n_r} \sum_{i \in F^k} w_k^r \|P(\mathcal{T}, \beta^k)_i - P(\mathcal{T}^*, \beta^{k*})_i - U_i\|^2.$$ Equation 13

In operation 640, the tracking component 240 tracks the face across the set of images based on the set of facial regions, the rigidity weight of each facial region, and the dense motion flow of the facial area mapped to the facial vertices. With the rigid coefficients and the non-rigid coefficients from previous frames, the tracking component 240 identifies a projection of the object being tracked within a current frame or a subsequent frame. The object projection may be represented as $P(\mathcal{T}^*, \beta^*)_i + U_i.$ Modules, Components, and Logic Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 11:
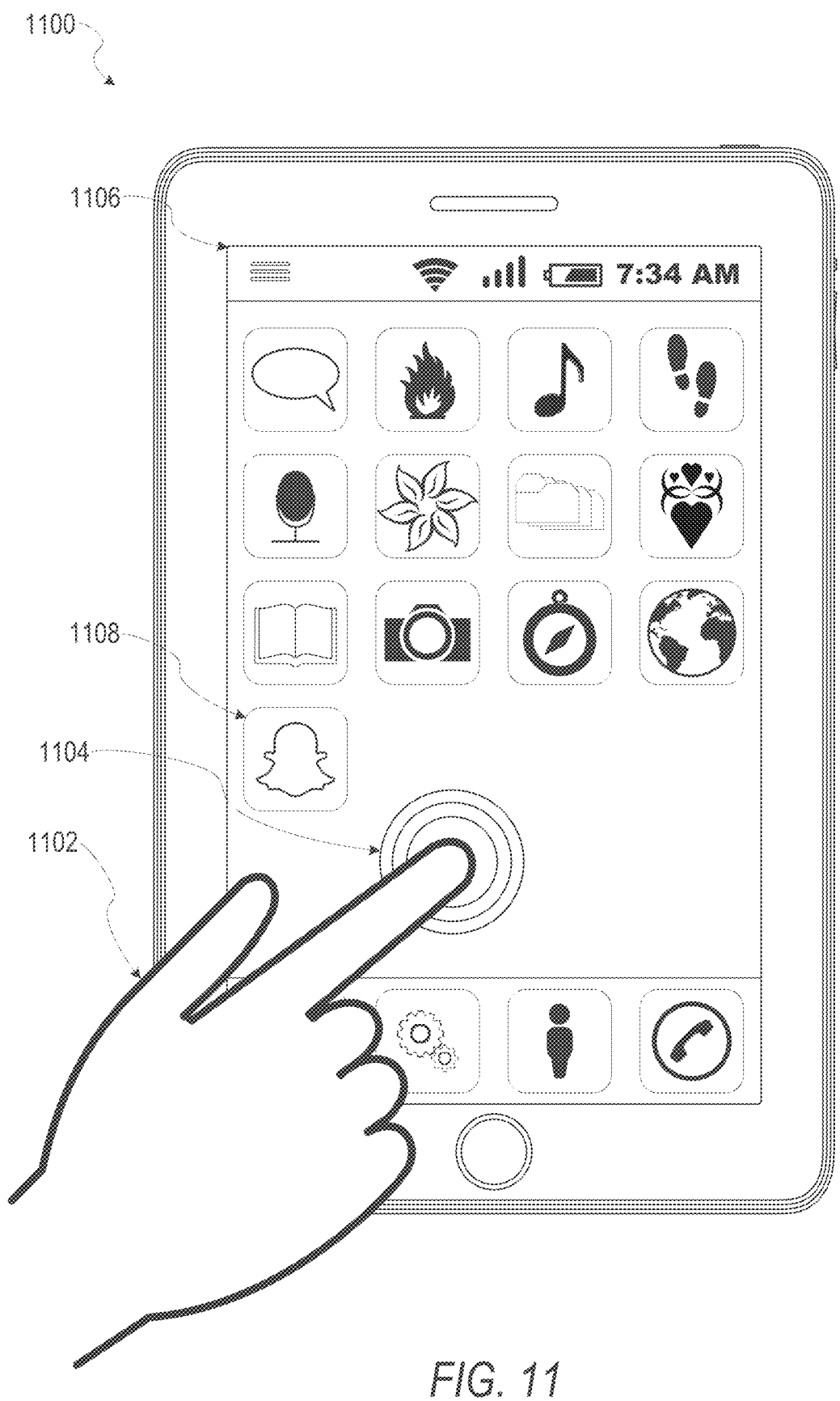
FIG. 11 is a user interface diagram depicting an example mobile device and mobile operating system interface, according to some example embodiments.

FIG. 11 illustrates an example mobile device 1100 executing a mobile operating system (e.g., IOS™, ANDROID™, WINDOWS® Phone, or other mobile operating systems), consistent with some embodiments. In one embodiment, the mobile device 1100 includes a touch screen operable to receive tactile data from a user 1102. For instance, the user 1102 may physically touch 1104 the mobile device 1100, and in response to the touch 1104, the mobile device 1100 may determine tactile data such as touch location, touch force, or gesture motion. In various example embodiments, the mobile device 1100 displays a home screen 1106 (e.g., Springboard on IOS™) operable to launch applications or otherwise manage various aspects of the mobile device 1100. In some example embodiments, the home screen 1106 provides status information such as battery life, connectivity, or other hardware statuses. The user 1102 can activate user interface elements by touching an area occupied by a respective user interface element. In this manner, the user 1102 interacts with the applications of the mobile device 1100. For example, touching the area occupied by a particular icon included in the home screen 1106 causes launching of an application corresponding to the particular icon.

The mobile device 1100, as shown in FIG. 11, includes an imaging device 1108. The imaging device 1108 may be a camera or any other device coupled to the mobile device 1100 capable of capturing a video stream or one or more successive images. The imaging device 1108 may be triggered by the object tracking system 160 or a selectable user interface element to initiate capture of a video stream or succession of images and pass the video stream or succession of images to the object tracking system 160 for processing according to the one or more methods described in the present disclosure.

Many varieties of applications (also referred to as "apps") can be executing on the mobile device 1100, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1100 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1100 includes a social messaging app 1108, consistent with some embodiments, allows users to exchange ephemeral messages that include media content. In this example, the social messaging app can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the object tracking system 160 may track objects in a video stream within the ephemeral message, and transmit the ephemeral message to another device using the ephemeral message system.

Software Architecture

Figure 12:
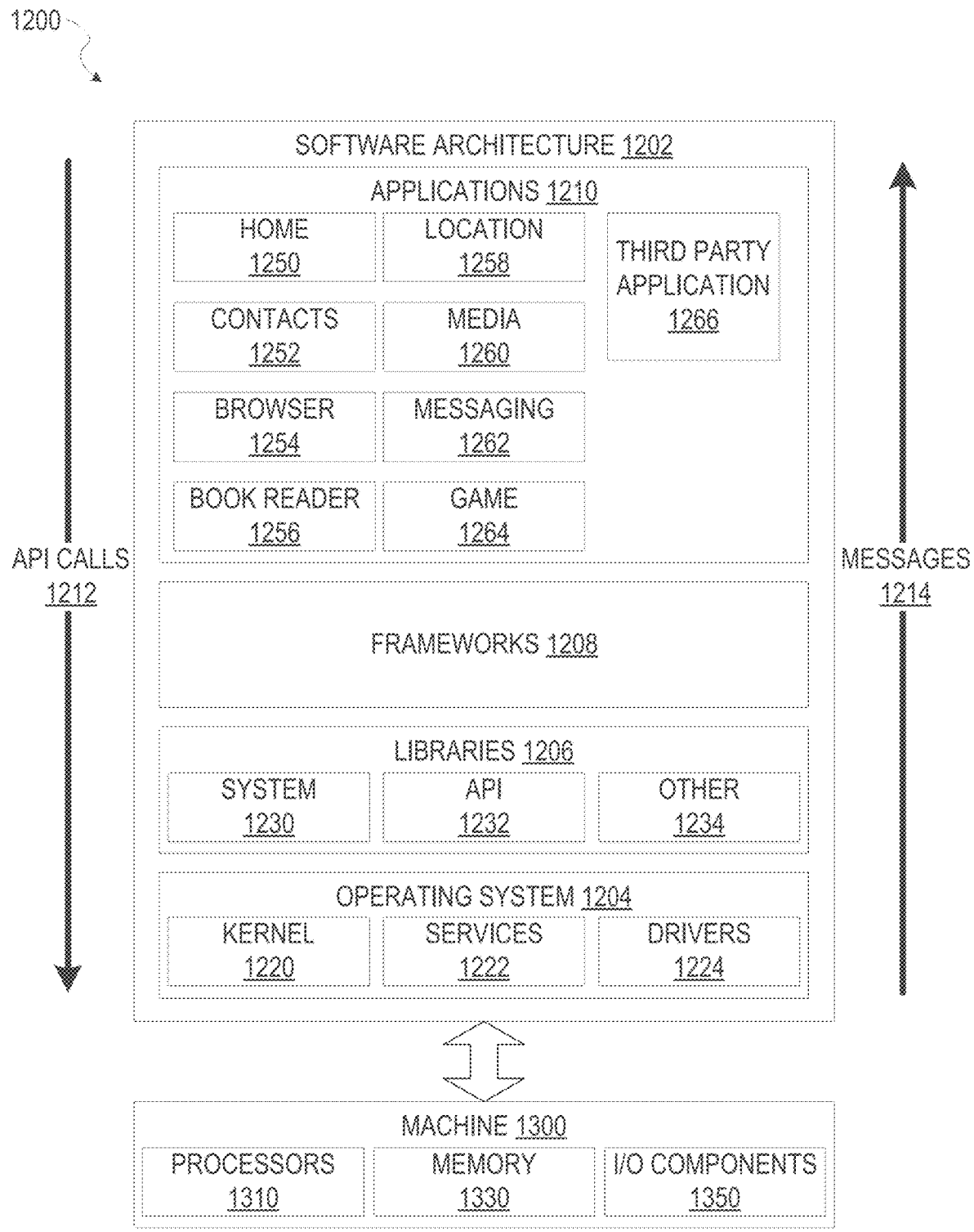
FIG. 12 is a block diagram illustrating an example of a software architecture that may be installed on a machine, according to some example embodiments.

FIG. 12 is a block diagram 1200 illustrating an architecture of software 1202, which can be installed on the devices described above. FIG. 12 is merely a non-limiting example of a software architecture, and it will be appreciated that many other architectures can be implemented to facilitate the functionality described herein. In various embodiments, the software 1202 is implemented by hardware such as machine a 1300 of FIG. 13 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications, such as a third-party application 1266. According to some embodiments, the applications 1210 are programs that execute functions defined in the programs. Various programming languages can be employed to create the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third-party application 1266 can invoke the API calls 1212 provided by the operating system 1204 to facilitate functionality described herein.

Example Machine Architecture and Machine-Readable Medium

Figure 13:
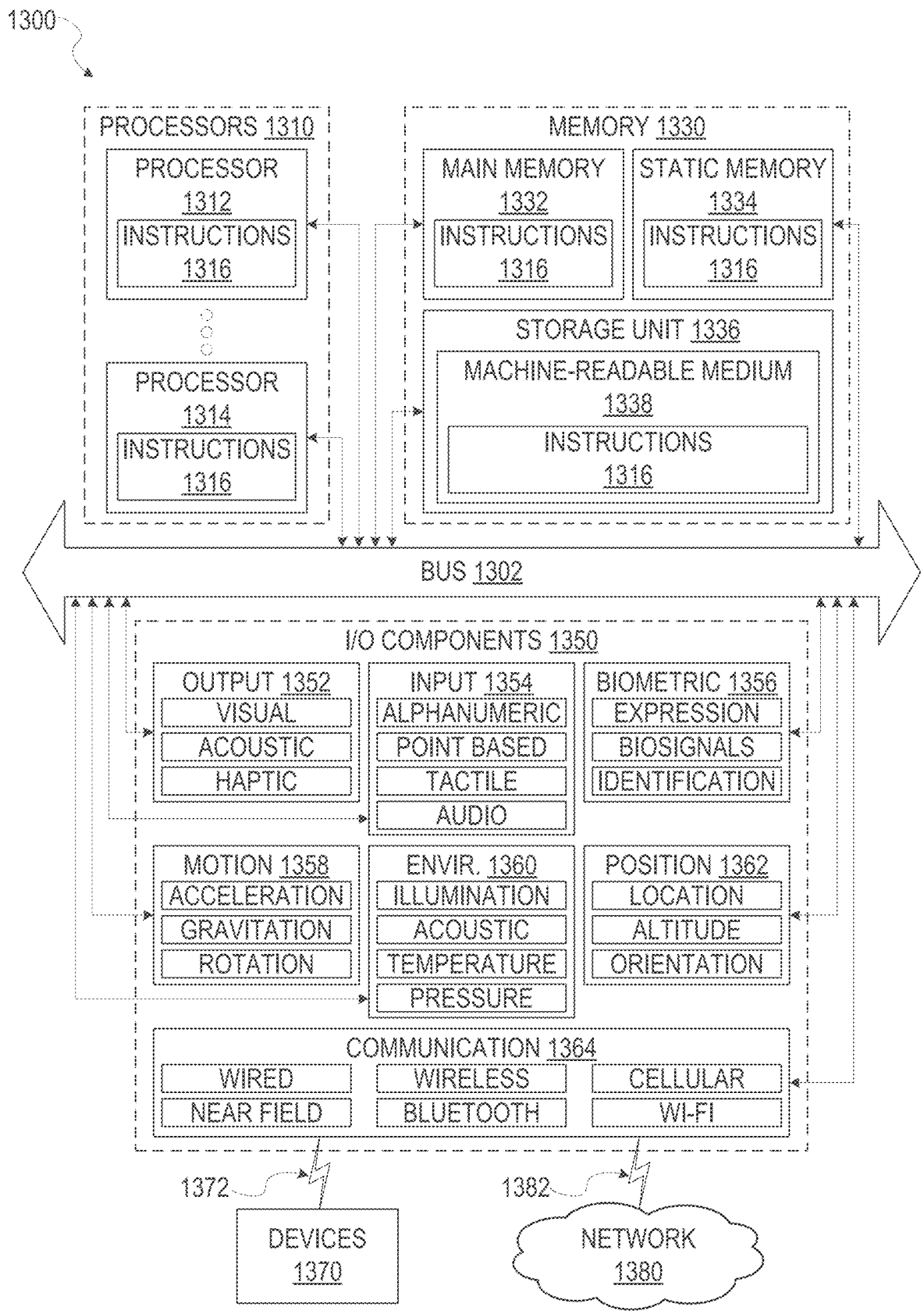
FIG. 13 is a block diagram presenting a diagrammatic representation of a machine in the form of a computer system within which a set of instructions may be executed for causing the machine to perform any of the methodologies discussed herein, according to an example embodiment.

FIG. 13 is a block diagram illustrating components of a machine 1300, according to some embodiments, able to read instructions (e.g., processor executable instructions) from a machine-readable medium (e.g., a non-transitory machine-readable storage medium) and perform any of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1312 and a processor 1314 that may execute the instructions 1316. The term "processor" is intended to include multi-core processors that may comprise two or more independent processors (also referred to as "cores") that can execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by processors of the machine 1300 (e.g., processors 1310), cause the machine 1300 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The IO components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    accessing a set of images depicting at least a portion of a real-world object;
    identifying a set of regions of the real-world object;
    tracking the real-world object across the set of images, the tracking comprising:
        solving for rigid pose parameters and expression parameters in alternating optimizations, such that during rigid pose optimization, expression parameters are fixed while the rigid pose parameters are determined and, during expression optimization, rigid pose parameters are fixed while the expression parameters are determined; and
        based on the rigid pose parameters and expression parameters, tracking a first region of the set of regions based on a first model and a second region of the set of regions based on a second model; and
    overlaying a virtual object over a portion of the real-world object depicted in the image in accordance with tracking the real-world object across the set of images using the first and second models.

2. The method of claim 1, wherein the object includes a face depicted in the set of images, further comprising:
    identifying a set of facial regions of a face, each facial region of the set of facial regions intersecting another facial region with at least one common vertex which is a member of a set of facial vertices; and
    adaptively modifying weights generated for each facial region to prioritize tracking of the face based on the weights.

3. The method of claim 2, wherein identifying the set of facial regions comprises segmenting each facial region in the set of facial regions separately, and for each facial region of the set of facial regions, generating a weight formed from a set of region coefficients, wherein the object is tracked based on the set of facial regions and the weight of each facial region of the set of facial regions.

4. The method of claim 1, wherein tracking the object comprises applying rigid and non-rigid optimizations to jointly estimate model and the rigid pose parameters.

5. The method of claim 1, wherein identifying the set of regions comprises:
determining that a first object region in the set of regions corresponds to a first portion of the object that is more flexible than a second portion of the object corresponding to a second object region in the set of regions.

6. The method of claim 5 further comprising:
assigning a first weight to the first object region and a second weight to the second object region; and
adjusting the first weight to be greater than the second weight for optimizing an expression of the object.

7. The method of claim 5 further comprising:
assigning a first weight to the first object region and a second weight to the second object region; and
adjusting the second weight to be greater than the first weight for optimizing a head pose corresponding to the object.

8. The method of claim 5, wherein the first portion of the object comprises at least one of a cheek, mouth, or eye.

9. The method of claim 5 further comprising performing the tracking until convergence.

10. The method of claim 1 further comprising determining values for weights based on training data comprising a plurality of synthetic facial animation sequences and first and second rigid transformations of the plurality of synthetic facial animation sequences.

11. The method of claim 10, wherein the first transformation comprises a transformation captured from a video and the second transformation comprises a transformation captured from a static image.

12. The method of claim 1, wherein a set of region coefficients comprises a rigid coefficient and a non-rigid coefficient, further comprising:
computing the rigid coefficient for each object region while maintaining the non-rigid coefficient at a first fixed value; and
computing the non-rigid coefficient for each object region while maintaining the rigid coefficient at a second fixed value.

13. The method of claim 1, wherein the virtual object comprises virtual makeup.

14. The method of claim 1 further comprising animating an avatar in accordance with tracking the object across the set of images.

15. A system comprising:
one or more processors; and
a non-transitory processor-readable storage medium storing processor executable instructions that, when executed by the one or more processors, cause the one or more processors to perform operations comprising:
accessing a set of images depicting at least a portion of a real-world object;
identifying a set of regions of the real-world object;
tracking the real-world object across the set of images, the tracking comprising:
solving for rigid pose parameters and expression parameters in alternating optimizations, such that during rigid pose optimization, expression parameters are fixed while the rigid pose parameters are determined and, during expression optimization, rigid pose parameters are fixed while the expression parameters are determined; and
based on the rigid pose parameters and expression parameters, tracking a first region of the set of regions based on a first model and a second region of the set of regions based on a second model; and
overlaying a virtual object over a portion of the real-world object depicted in the image in accordance with tracking the real-world object across the set of images using the first and second models.

16. The system of claim 15, wherein the operations further comprise overlaying a graphical object over a portion of the object in accordance with tracking the object across the set of images.

17. The system of claim 16, wherein the graphical object comprises virtual makeup.

18. The system of claim 15 further comprising animating an avatar in accordance with tracking the object across the set of images.

19. A non-transitory computer-readable medium comprising instructions that, when executed by a processor, configure the processor to perform operations comprising:
accessing a set of images depicting at least a portion of a real-world object;
identifying a set of regions of the real-world object;
tracking the real-world object across the set of images, the tracking comprising:
solving for rigid pose parameters and expression parameters in alternating optimizations, such that during rigid pose optimization, expression parameters are fixed while the rigid pose parameters are determined and, during expression optimization, rigid pose parameters are fixed while the expression parameters are determined; and
based on the rigid pose parameters and expression parameters, tracking a first region of the set of regions based on a first model and a second region of the set of regions based on a second model; and
overlaying a virtual object over a portion of the real-world object depicted in the image in accordance with tracking the real-world object across the set of images using the first and second models.

20. The non-transitory computer-readable medium of claim 19, wherein the virtual object comprises virtual makeup.

* * * * *

UNITED STATES PATENT AND TRADEMARK OFFICE
CERTIFICATE OF CORRECTION

| | | |
|---|---|---|
| PATENT NO. | : 11,769,259 B2 | Page 1 of 1 |
| APPLICATION NO. | : 17/248908 | |
| DATED | : September 26, 2023 | |
| INVENTOR(S) | : Cao et al. | |

It is certified that error appears in the above-identified patent and that said Letters Patent is hereby corrected as shown below:

On the Title Page

In Column 2, Item (56) under "Other Publications", Line 2, delete "Stabalized" and insert --Stabilized-- therefor Signed and Sealed this
Fourth Day of March, 2025

Coke Morgan Stewart
*Acting Director of the United States Patent and Trademark Office*